(12) United States Patent
Ishino et al.

(10) Patent No.: US 8,042,332 B1
(45) Date of Patent: Oct. 25, 2011

(54) TRANSAXLE

(75) Inventors: Fumitoshi Ishino, Amagasaki (JP); Masaru Iida, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 716 days.

(21) Appl. No.: 12/131,707

(22) Filed: Jun. 2, 2008

(51) Int. Cl.
*F16D 31/02* (2006.01)

(52) U.S. Cl. .......................................................... 60/454

(58) Field of Classification Search ....................... 60/454
See application file for complete search history.

(56) References Cited

U.S. PATENT DOCUMENTS 6,185,936 B1 * 2/2001 Hauser et al. ................... 60/487

FOREIGN PATENT DOCUMENTS

JP 2000-108699 4/2000

* cited by examiner

*Primary Examiner* — Daniel Lopez
(74) *Attorney, Agent, or Firm* — Sterne, Kessler, Goldstein & Fox P.L.L.C.

(57) ABSTRACT

An axle driving device includes a hydrostatic transmission (HST) having a hydraulic pump and a hydraulic motor which are in fluid communication with one another through a closed circuit within a center section of the HST, an axle capable of being driven by driving power of various speeds from the HST, a common housing which houses the HST and the axle, wherein the center section is provided with an oil hole for supplying a working fluid to the closed circuit, the oil hole is connected to an oil filter placed in an oil reservoir within the housing, and a magnet provided near the oil filter, wherein a magnet holding portion for holding the magnet is formed integrally with the center section.

12 Claims, 17 Drawing Sheets

TRANSAXLE

BACKGROUND OF THE INVENTION

1. Field of the Invention

The present invention relates to an axle driving device including a hydrostatic transmission (hereinafter, referred to as an "HST") having a hydraulic pump and a hydraulic motor which are in fluid communication with one another through a closed circuit within a center section of the HST, an axle capable of being driven by driving power of various speeds from the HST, and a common housing which houses the HST and the axle. More particularly, the present invention relates to a structure for mounting a magnet capable of removing iron powder from lubrication oil to be supplied as a working fluid from an oil reservoir within the housing to the closed circuit.

2. Related Art

Conventionally, an axle driving device includes an HST housed within a housing which is filled with lubrication oil which also serves as a working fluid. The lubrication oil may contain iron powder which has been cut away from transmission gears provided between the HST and the axle during the rotation thereof. The lubrication oil may also contain iron powder in the form of work dusts which may have been originally adhered to the members constituting the axle driving device. This iron powder may flow within the housing together with the lubrication oil because of changes in the volume of the lubrication oil caused by the oil-temperature change, starting and stopping of the HST, or agitation caused by the operation of the HST and the rotations of the transmission gears, among other things. As a result, the iron powder may be introduced into the closed circuit within the HST together with the lubrication oil as the working fluid, which may reduce the durability of the HST by, for example, causing damage to its sliding surface.

Known techniques for efficiently eliminating iron powder include attracting the iron powder to a magnet mounted within a housing and filtering iron powder with a common oil filter made of a porous material. Japanese App. No. 2000-108699 discloses an exemplary axle driving device which employs such an iron-powder elimination technique using a magnet. The axle driving device taught by App. No. 200-108699 is provided with plate-shaped magnets which are placed on respective wall portions of the housing and also near an oil filter connected to an oil hole leading to a closed circuit in a center section.

In such an assembly, the magnets near the oil filter are mounted on upper and lower cover plates for sandwiching the oil filter at its upper and lower portions. For example, in the case of the lower cover plate, the magnet is attracted and secured through its magnetic force to an upper surface or a lower surface of the lower cover plate made of a magnetic material such as an iron plate or a nickel plate, while, in the case of the upper cover plate, the magnet is hung by providing a mounting member such as a bridge or a pedestal.

Requiring additional components to securely mount the magnets, such as upper and lower cover plates, increases component costs and unnecessarily complicates assembly. Further, where a plate-shaped magnet is mounted to the lower cover plate by attraction thereto, only one surface is free as an iron-powder attracting surface, thereby presenting a smaller absorption area and poor iron-powder reduction efficiency. In addition, in this configuration, the magnet may not be fixed to the cover plate firmly. Accordingly, in the event that sudden vibrations act on the cover plates, the magnet may freely move and impinge on peripheral components such as the oil filter, thus inducing fractures or other damage to these components. Accordingly, a need exists for a structure capable of overcoming one or more of the limitations described above.

SUMMARY OF THE INVENTION

It is an object of the present invention to provide a magnet mounting structure employing a smaller number of components, having a larger iron-powder absorption area and also being usable for firmly fixing a magnet, in an axle driving device including an HST.

In order to attain the object, an axle driving device according to the present invention includes a HST having a hydraulic pump and a hydraulic motor which are in fluid communication with one another through a closed circuit within a center section of the HST, an axle capable of being driven by driving power of various speeds from the HST, a common housing which houses the HST and the axle, wherein the center section is provided with an oil hole for supplying a working fluid to the closed circuit, and the oil hole is connected to an oil filter placed in an oil reservoir within the housing, and a magnet is provided near the oil filter, and a magnet holding portion for holding the magnet is formed integrally with the center section.

With the axle driving device, it is possible to mount the magnet at a portion of the center section for reducing iron powder in the working fluid to be supplied to the closed circuit. This eliminates the necessity of using a separate mounting member, thereby reducing the component cost and improving the ease of assembling. Further, in comparison with cases where a magnet is held through attraction, firmly mounting the magnet can prevent the magnet from freely moving and impinging on peripheral components such as the oil filter to induce fractures of these components or to cause iron power which has been attracted and held on the magnet until then to disperse peripherally due to the impingement. This can extend the lives of the components and increase the iron-powder reduction efficiency.

Preferably, an inner wall of the housing includes a magnet mounting seat portion for fixing the magnet by sandwiching the magnet between the magnet mounting seat portion and the magnet holding portion.

This enables fixing the magnet more firmly by sandwiching the magnet between the magnet holding portion in the center section and the magnet mounting seat portion in the housing, which can prevent the magnet from moving freely, thereby further extending the lives of components and increasing the iron-powder reduction efficiency.

Preferably, the oil filter has a tubular shape which covers an opening of the oil hole, the magnet has a plate shape, and the magnet is interposed between the center section and the housing such that the magnet's longitudinal direction is along the outer peripheral surface of the oil filter.

This can increase the overall attraction surface area, thereby further increasing the iron-powder reduction efficiency. Further, the flow of the working fluid inside of the oil filter through the outer peripheral surface of the cylindrical-shaped oil filter is blocked by the plate-shaped magnet placed along the oil filter. This can induce many flow-residence areas and vortexes around the magnet, thereby causing even fine iron powder capable of passing through the oil filter, as well as coarse iron powder, to be drawn into these residence areas and vortexes and attracted by the magnet. This enables elimination of iron powder with various grain sizes, through attraction.

The above and other objects, features, and advantages of the present invention will become more apparent from the following description with reference to the accompanying drawings.

DESCRIPTION OF THE PREFERRED EMBODIMENTS

Figure 1:
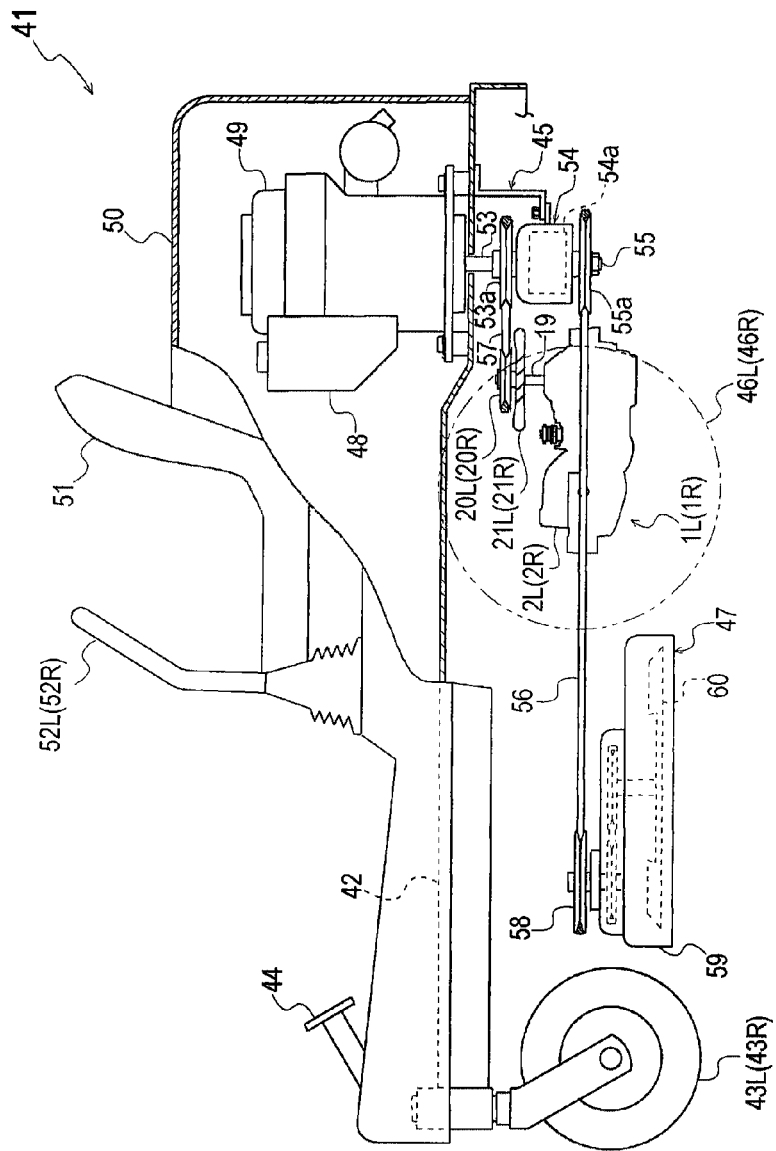
FIG. 1 is a partial cross-sectional side view of a hydraulically-driven work vehicle according to a first example of the present invention.
Figure 2:
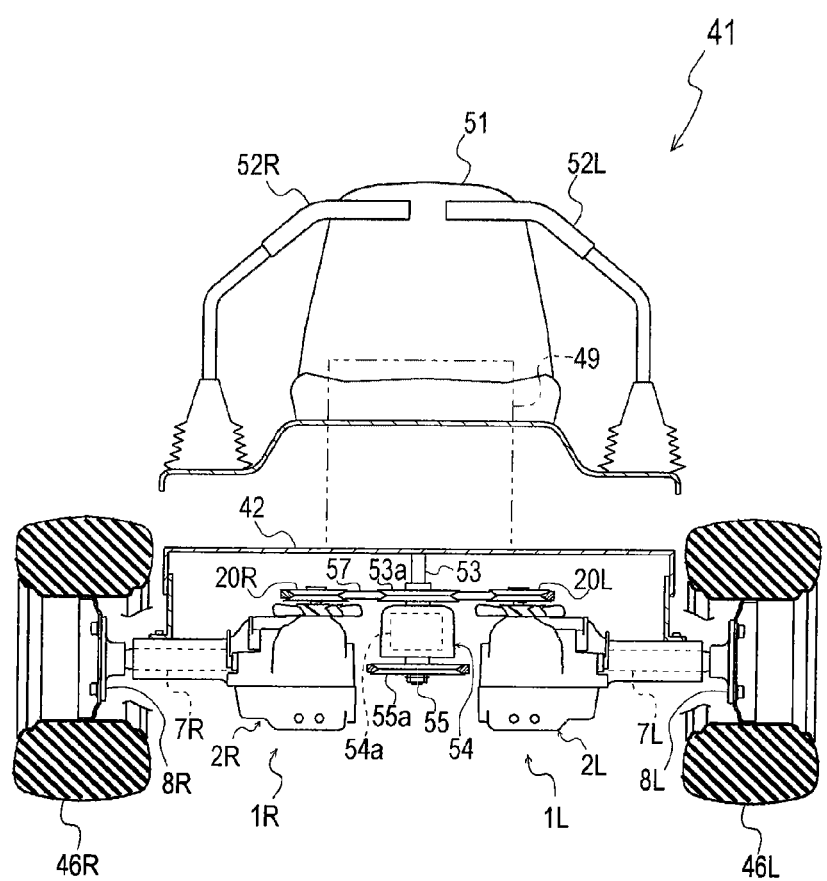
FIG. 2 is a partial cross-sectional front view of the same.

The general structure of a hydraulically-driven work vehicle 41 such as a lawn mower which incorporates axle driving devices 1L and 1R according to a first example of the present invention will be described with reference to FIGS. 1 and 2.

In the hydraulically-driven work vehicle 41, a machine body frame 42 is extended in the forward and rearward directions, left and right caster wheels 43L and 43R are placed at the opposite sides of the front portion of the machine body frame 42 and, further, the axle driving devices 1L and 1R according to the present invention are supported by the rear portion of the machine body frame 42 in the leftward and rightward directions of the machine body. Left and right axles 7L and 7R protrude from the respective axle driving devices 1L and 1R outwardly in the lateral direction. Rear wheels 46L and 46R are secured through flanges 8L and 8R to the outer end portions of the axles 7L and 7R, respectively. A mower 47 is placed under the machine body frame 42 between the rear wheels 46L and 46R and the caster wheels 43L and 43R.

Further, on the rear portion of the machine body frame 42, there is placed an engine 49 with a fuel tank 48 provided on its front surface. The machine body frame 42, the fuel tank 48 and the engine 49 are covered with a cover 50, and a seat 51 is placed on the cover 50. In front of the seat 51, a pair of left and right steering levers 52L and 52R are provided. In front of the steering levers 52L and 52R, a brake pedal 44 is provided.

An engine output shaft 53 protrudes vertically downward from the engine 49, while a clutch bracket 45 is vertically provided on the rear portion of the machine body frame 42, and a clutch housing 54 is secured to the clutch bracket 45. Further, the engine output shaft 53 is inserted in the clutch housing 54, so that this engine output shaft 53 serves as a primary-side transmission shaft of an electromagnetic clutch 54a for connecting and disconnecting the driving power of the work machine which is provided inside the clutch housing 54, and a work-machine driving shaft 55 is vertically provided as a secondary-side transmission shaft of the electromagnetic clutch 54a, on the same axis as that of the engine output shaft 53 under the clutch housing 54.

Further, across the clutch housing 54, an upper pulley 53a for driving the axles is secured to the engine output shaft 53 thereabove, and a lower pulley 55a for driving the work machine is secured to the work-machine driving shaft 55 therebelow. Among them, the lower pulley 55a is coupled to an input pulley 58 of the mower 47 through a belt 56, which enables driving the mower 47 through the driving power from the engine 49. A plurality of blades 60 are housed within a deck 59 of the mower 47, which enables operations for cutting lawn and the like by rotating the blades 60. Further, the mower 47 is arbitrarily operated to be ascended and descended through a hydraulic hoisting/lowering device, which is not illustrated.

On the other hand, the upper pulley 53a is coupled to respective input pulleys 20L and 20R of the left and right axle driving devices 1L and 1R through a single input belt 57, so that the driving power from the engine 49 is transmitted to the input pulleys 20L and 20R for driving the axles 7L and 7R. Further, the pair of steering levers 52L and 52R are coupled to respective variable-speed arms 27 in the axle driving devices 1L and 1R, respectively, which will be described later, such that the rotation speeds of the left and right axles 7L and 7R can be arbitrarily changed, in such a way that the machine body travels straight in the forward and rearward directions if these steering levers 52L and 52R are inclined in the same direction by the same angle or in such a way that the machine body changes its travel path in the leftward and rightward directions if they are inclined in different directions or by different angles.

Figure 3:
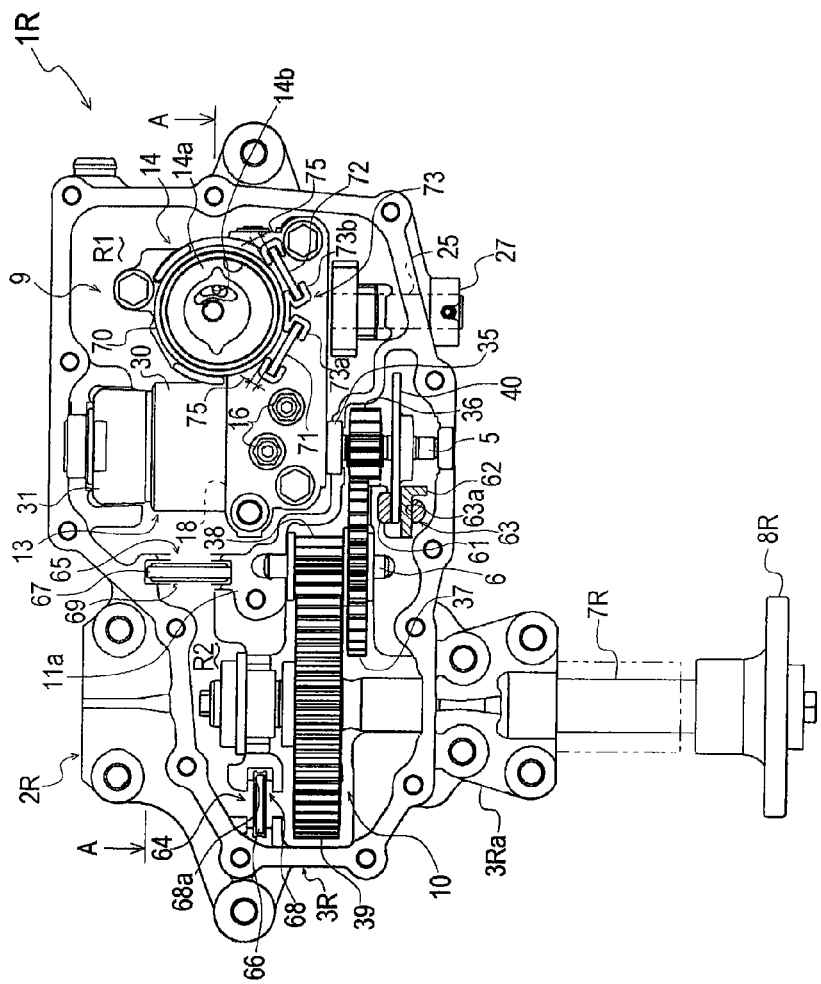
FIG. 3 is a partial cross-sectional bottom view of an axle driving device according to the first example of the present invention.
Figure 4:
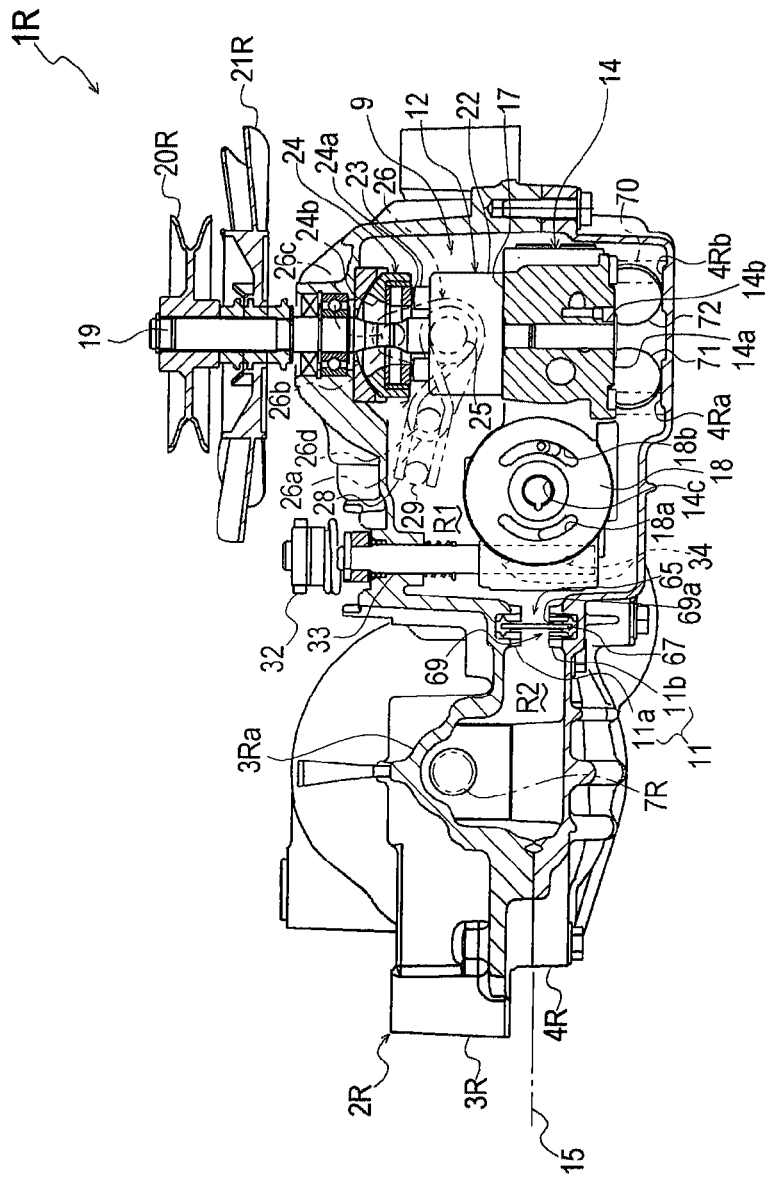
FIG. 4 is a cross-sectional view taken along the line A-A in FIG. 3.

Next, with reference to FIGS. 3 and 4, the entire structure of the axle driving devices 1L and 1R will be described. Further, the left and right axle driving devices 1L and 1R have a bilaterally-symmetric structure and, therefore, the structure of only the right axle driving device 1R will be described, hereinafter.

In the axle driving device 1R, the housing 2R is constituted by an upper housing 3R and a lower housing 4R which are bonded to each other within a bonding plane 15 at their outer edges. Within the bonding plane 15, there are provided bearing portions for a motor shaft 5 and a counter shaft 6 which will be described later. A bearing portion 3Ra for the axle 7R is placed within the upper housing 3R such that it is upwardly biased above the bonding plane 15. Further, one end of the axle 7R is protruded outwardly from a side wall of the upper housing 3R, and the flange 8R for mounting wheels is secured to this protruded end.

The inside of the housing 2R is partitioned into a first oil chamber R1 and a second oil chamber R2 by an internal wall 11 formed integrally with the housing 2R. Out of them, the first oil chamber R1 houses an integrated HST 9 constituted by a hydraulic pump 12 and a hydraulic motor 13 which are fluidly connected to each other through a center section 14, while the second oil chamber R2 houses an axle 7R and a drive train 10 constituted by a plurality of gears for transmitting the driving power from the motor shaft 5 to the axle 7R. As described above, the HST 9, the drive train 10 and the axle 7R are housed within the common housing 2R, so that the axle driving device 1R is relatively compact.

Further, the internal wall 11 is constituted by an upper wall portion 11a vertically hung from the ceiling surface of the upper housing 3R toward the bonding plane 15 and a lower wall portion 11b raised toward the bonding plane 15 from the inner bottom surface of the lower housing 4R. Since the upper housing 3R and the lower housing 4R are bonded to each other, both the wall portions 11a and 11b are bonded to each other at their end surfaces, thereby defining and forming the two independent oil chambers R1 and R2 within the housing 2R, such that the first oil chamber R1 and the second oil chamber R2 are adjacent to each other. Further, an oil reservoir is formed in each of the first oil chamber R1 and the second oil chamber R2 and, these oil reservoirs are filled with common lubrication oil which can be supplied to the HST 9 as a working fluid.

Next, with reference to FIGS. 3 to 5, the structure of the HST 9 and the variable-speed control structure will be described.

In the HST 9, the center section 14 is detachably fastened and secured through bolts 16 or the like, from therebelow, to the inside of the upper housing 3R within the first oil chamber R1. The center section 14 is placed such that its longitudinal direction coincides with the forward and rearward directions, namely with a direction substantially orthogonal to the axle 7R. Further, the center section 14 is provided with a motor-mounting surface 18 on a vertical surface at its front portion, and the hydraulic motor 13 is placed on the motor-mounting surface 18. On the other hand, the center section 14 is provided with a pump-mounting surface 17 on a horizontal surface at its the rear portion, and the hydraulic pump 12 is placed on the pomp-mounting surface 17.

A pump shaft 19 is vertically supported at the center of the pump-mounting surface 17 of the hydraulic pump 12, this pump shaft 19 protrudes outward through the upper wall of the upper housing 3R, the input pulley 20R is secured to this protruded end, and the driving power from the engine 49 is inputted to the input pulley 20R through the input belt 57, as described above. Further, a cooling fan 21R is secured to the pump shaft 19 below the input pulley 20R, which enables cooling the axle driving device 1R placed therebelow, by rotating the cooling fan 21R.

A cylinder block 22 is rotatably and slidably installed on the pump-mounting surface 17, a plurality of pistons 23 are reciprocally fitted within a plurality of cylinder holes in the cylinder block 22 through biasing springs, and a thrust bearing 24a of a movable inclined plate 24 is contacted with the head portions of these pistons 23. An opening portion 24b is provided at the center of the movable inclined plate 24 for allowing the pump shaft 19 to penetrate therethrough, and the pump shaft 19 is placed on the rotational axis of the cylinder block 22 and is engaged with the cylinder block 22 such that the pump shaft 19 and the cylinder block 22 can not rotate with respect to each other and the pump shaft 19 also serves as an input shaft, so that the hydraulic pump 12 of an axial piston type is structured.

The amount of oil ejected from the hydraulic pump 12 and the direction of the ejection of oil therefrom can be changed, by performing an operation for inclining the surface of the movable inclined plate 24 which contacts with the pistons by an arbitrary angle from the horizontal position with respect to the rotational axis of the cylinder block 22. Further, the back surface of the movable inclined plate 24 is formed to be a convex arc-shaped portion, while the inner surface of the upper portion of the upper housing 3R is provided with a concave arc-shaped portion which conforms to the shape of the convex arc-shaped portion. Thus, the movable inclined plate 24 has a cradle-type structure which slides while intimately contacting with the concave arc-shaped portion of the upper housing 3R when it is inclined.

In order to perform operations for inclining the movable inclined plate 24, a control shaft 25 parallel to the axle 7R is rotatably supported in the right side wall of the upper housing 3R at the same side as the drive train 10. The variable-speed arm 27 is mounted to the outer end portion of the control shaft 25 which extends to the outside of the housing, while a swaying arm 26 is mounted to the end portion of the control shaft 25 inside the housing, and the swaying arm 26 is constituted by a first arm 26a and a second arm 26b which extend radially from the control shaft 25.

The second arm 26b is provided, at its tip end, with a protrusion 26c, the axis of the control shaft 25 is coincident with the center of the inclination of the movable inclined plate 24, and the protrusion 26c can be directly engaged with a slot portion provided in a side surface of the movable inclined plate 24. Further, as described above, the variable-speed arm 27 is coupled to the steering lever 52R through a link mechanism which is not illustrated, such that they are in conjunction with each other.

With this structure, if the variable-speed arm 27 in the right axle driving device 1R is rotated in the forward or rearward direction of the machine body by operating the right steering lever 52R, the swaying arm 26 is forwardly or rearwardly rotated about the control shaft 25 to perform operations for inclining the movable inclined plate 24 through the protrusion 26c, thereby performing an operation for changing the output of the hydraulic pump 12. This also applies to the case where the left steering lever 52L is operated.

Further, the first arm 26a is provided, at its tip end, with an engagement pin 26d protruded therefrom, a neutral returning spring 28 of a torsion coil spring type is externally fitted to the control shaft 25 in the housing 2R, and the opposite ends of the neutral returning spring 28 are intersected with each other and are extended in the direction of the first arm 26a. Further, both the extended end portions of the neutral returning spring 28 sandwich the engagement pin 26d and an eccentric shaft 29 mounted to the inner wall of the upper housing 3R near the control shaft 25.

With this structure, if the swaying arm 26 is rotated through the variable-speed arm 27 for changing the speed, the neutral returning spring 28 is expanded at its one end by the engagement pin 26d, but the other end of the neutral returning spring 28 is stopped by the eccentric shaft 29, thereby applying a biasing force for neutral restoration to the variable-speed arm 27. Further, if the operation force applied to the variable-speed arm 27 is released, the engagement pin 26d is held at a neutral position defined by the eccentric shaft 29, due to the restoring force generated at the one end of the neutral returning spring 28. Further, the portion of the eccentric shaft 29 which extends to the outside of the housing 2R is formed to be an adjustment screw, and the eccentric shaft 29 can be arbitrarily rotated and displaced through the threaded portion of this adjustment screw, which displaces the swaying arm 26 about the control shaft 25 through the neutral returning spring 28, thereby enabling adjusting the movable inclined plate 24 to an accurate neutral position.

Further, by performing the operation for inclining the movable inclined plate 24 as described above, pressure oil ejected from the hydraulic pump 12 is transferred to the hydraulic motor 13 through the oil paths within the center section 14. In the hydraulic motor 13, a cylinder block 30 is rotatably and slidably installed on the motor-mounting surface 18 formed in the vertical surface of the center section 14, a plurality of pistons (which are not illustrated) are reciprocatably fitted and mounted in a plurality of cylinder holes in the cylinder block 30 through biasing springs, and a fixed inclined plate 31 is contacted with the head portions of the pistons. Further, the fixed inclined plate 31 is sandwiched and fixed between the upper housing 3R and the lower housing 4R.

A pair of arcuate ports (which are not illustrated) are formed in the pump-mounting surface 17 in the horizontal portion of the center section 14 for introducing the oil supplied and ejected from the cylinder block 22, while a pair of arcuate ports 18a and 18b are also formed in the motor-mounting surface 18 in the vertical portion of the center section 14 for introducing the oil supplied and ejected from the cylinder block 30.

Further, in the thick portion of the center section 14, a pair of main oil paths (which are not illustrated) are formed for communicating the arcuate ports in the pump-mounting surface 17 to the arcuate ports 18a and 18b in the motor-mounting surface 18, and these main oil paths and the like constitute a closed circuit for circulating a working fluid between the hydraulic pump 12 and the hydraulic motor 13.

Further, an oil hole 14b is formed in the circular-shaped lower surface 14a of the center section 14, and this oil hole 14b is communicated with the closed circuit through a check valve (which are not illustrated), so that the lubrication oil in the oil reservoir in the housing 2R can be sucked through the oil hole 14b and can be supplied as a working fluid to the closed circuit.

Further, a bypass operation lever 32 for opening the closed circuit to the oil reservoir is placed above the upper housing 3R, which enables idle rotations of the axle 7R during traction. In other words, the bypass operation lever 32 is secured at its base portion to the upper end of a bypass lever shaft 33 which is rotatably and vertically supported through a shaft to the upper wall of the upper housing 3R. The lower end of the bypass lever shaft 33 extends along one side surface of the vertical portion of the center section 14, a push pin 34 which can contact with the rotatable and slidable surface of the cylinder block 13 supported on another side surface of this vertical portion is slidably supported within the vertical portion, and the push pin 34 is contacted at its end surface with a flat surface formed in the lower end side surface of the bypass shaft 33.

Consequently, during traction of the vehicle, if an operator operates the bypass operation lever 32 outside the housing, this rotates the bypass lever shaft 33 to incline the flat surface at its lower end to push the push pin 34 toward the cylinder block 30, which causes the push pin 34 to release the intimate contact between the motor-mounting surface 18 and the cylinder block 30, thereby opening the closed circuit to the oil reservoir in the housing 2R through the arcuate ports 18a and 18b. This enables the motor shaft 5 to rotate freely, thereby enabling idle rotations of the axle 7R during the traction.

Next, with reference to FIGS. 3 and 4, there will be described the structure for transmitting the driving power from the HST 9 to the axle 7R.

On the rotational axis of the cylinder block 30, the motor shaft 5 is engaged therewith substantially in the horizontal direction, such that they can not rotate with respect to each other. The motor shaft 5 is supported, at its one end, in a bearing hole 14c in the motor-mounting surface 18 in the center section 14, further is rotatably supported, at the other end, through a bearing 35, to the internal wall 11 formed within the bonding plane 15 between the upper housing 3R and the lower housing 4R and, further, is inserted in the second oil chamber R2 at its tip end. Further, a bearing with a seal is employed as the bearing 35, in order to define the first oil chamber R1 and the second oil chamber R2.

Further, the drive train 10 for transmitting the driving power from the motor shaft 5 to the axle 7R is constituted by an output gear 36 secured to the motor shaft 5 protruding into the second oil chamber R2, a large-diameter gear 37 which is kept engaged with the output gear 36 and is supported on the counter shaft 6, a small-diameter gear 38 with a larger width which is supported on the counter shaft 6 which is rotated integrally with the large-diameter gear 37, and a final gear 39 with a larger diameter which is kept engaged with the small-diameter gear 38 and is supported on the axle 7R, thereby constituting a speed reduction gear train capable of transmitting the driving power which has been generated from the engine 49 and changed in speed by the HST 9 to the axle 7R after speed reduction through the output gear 36, the large-diameter gear 37, the small-diameter gear 38 and the final gear 39 in the mentioned order.

A brake disk 40 is secured to the tip end portion of the motor shaft 5 positioned within the second oil chamber R2, brake pads 61 and 62 are interposed between the front side of the upper portion of the brake disk 40 and the inner surface of the upper housing 3R, and the brake disk 40 is sandwiched between the brake pads 61 and 62. Further, a brake operation shaft 63 is placed on the outer side of the outer brake pad 62.

The brake operation shaft 63 is vertically placed and, also, is rotatably supported by the upper housing 3R and the lower housing 4R. The upper end of the brake operation shaft 63 protrudes upwardly from the housing 2R and is coupled to the brake pedal 44 in conjunction therewith, through a brake lever, a wire and the like (which are not illustrated). On the other hand, the lower end of the brake operation shaft 63 which exists within the housing 2R is formed into a half-split shape, and the brake pad 62 is contacted with the flat cutout 63a.

Accordingly, if an operation for depressing the brake pedal 44 is performed, this rotates the brake operation shaft 63 to cause the end portion of the cutout 63a to push the back surface of the brake pad 62, which sandwiches the brake disk 40 between the inner and outer brake pads 61 and 62, thereby braking the motor shaft 5.

Next, with reference to FIGS. 3 to 5, there will be described the structure for mounting magnets in the aforementioned axle driving device 1R.

In the axle driving device 1R, there are formed the respective oil reservoirs which are filled with common lubrication oil, as described above, in the first oil chamber R1 which houses the HST 9 and the second oil chamber R2 which houses the drive train 10. Further, within the second oil chamber R2, out of them, a concave portion in the upper housing 3R and a concave portion in the lower housing 4R are combined with each other to form a flow path 64. A plate-shaped magnet 66 is fitted and placed within this flow path 64, through a mounting seat 68.

Further, in the internal wall 11 defining the first oil chamber R1 and the second oil chamber R2, a concave portion in the upper wall portion 11a and a concave portion in the lower wall portion 11b are combined with each other to form a communication path 65, so that the lubrication oil in the first oil chamber R1 and the lubrication oil in the second oil chamber R2 can intercommunicate with each other through the communication path 65, and a plate-shaped magnet 67 is fitted and placed in the communication path 65 through a mounting seat 69.

The mounting seat 68 is provided with long holes 68a and 68a at upper and lower portions opposing to each other, and the upper and lower portions of the magnet 66 can be inserted in the long holes 68a and 68a so that the magnet 66 can be fitted and secured thereto. Similarly, the mounting seat 69 is provided with long holes 69a and 69a at upper and lower portions opposing to each other, and the upper and lower portions of the magnet 67 can be inserted in the long holes 69a and 69a, so that the magnet 67 is fitted and secured thereto. Further, the structure for mounting the magnets 66 and 67 in the flow path 64 within the second oil chamber and the communication path 65 between both the oil chambers can be any structure capable of preventing the disengagement of the magnets 66 and 67 due to the flowing lubrication oil while being capable of facilitating the detachment of them from the housing 2R during assembling, and the mounting structure is not limited to the present example.

With this structure, iron powder mixed in the lubrication oil within the housing 2R, particularly iron powder which has been cut away from the gears 36 to 39 in the drive train 10 and mixed in the lubrication oil during driving the gears 36 to 39 at the state where the adjacent gears are kept engaged with one another, is passed through the flow path 64 within the second oil chamber R2, then passed through the communication path 65 between the first oil chamber R1 and the second oil chamber R2 and then flowed into the first oil chamber R1, together with the lubrication oil flowing due to the oil-temperature change along with the driving and the stopping of the HST 9. During this, the iron powder is attracted and adhered to the magnets 66 and 67, so that the lubrication oil is cleaned until it enters the first oil chamber R1. Further, even after flowing into the first oil chamber R1, the lubrication oil is further cleaned by the magnet 67 in the communication path 65, while the lubrication oil flows within the first oil chamber R1.

Further, when the lubrication oil which has been cleaned to some degree is supplied as a working fluid to the HST 9, the lubrication oil passes by magnets 71 and 72 placed with the mounting structure according to the present invention, then passes through an oil filter 70 for filtering the lubrication oil from the magnets 71 and 72 and, thereafter, is introduced into the closed circuit within the HST 9 through the oil hole 14b.

Figure 5:
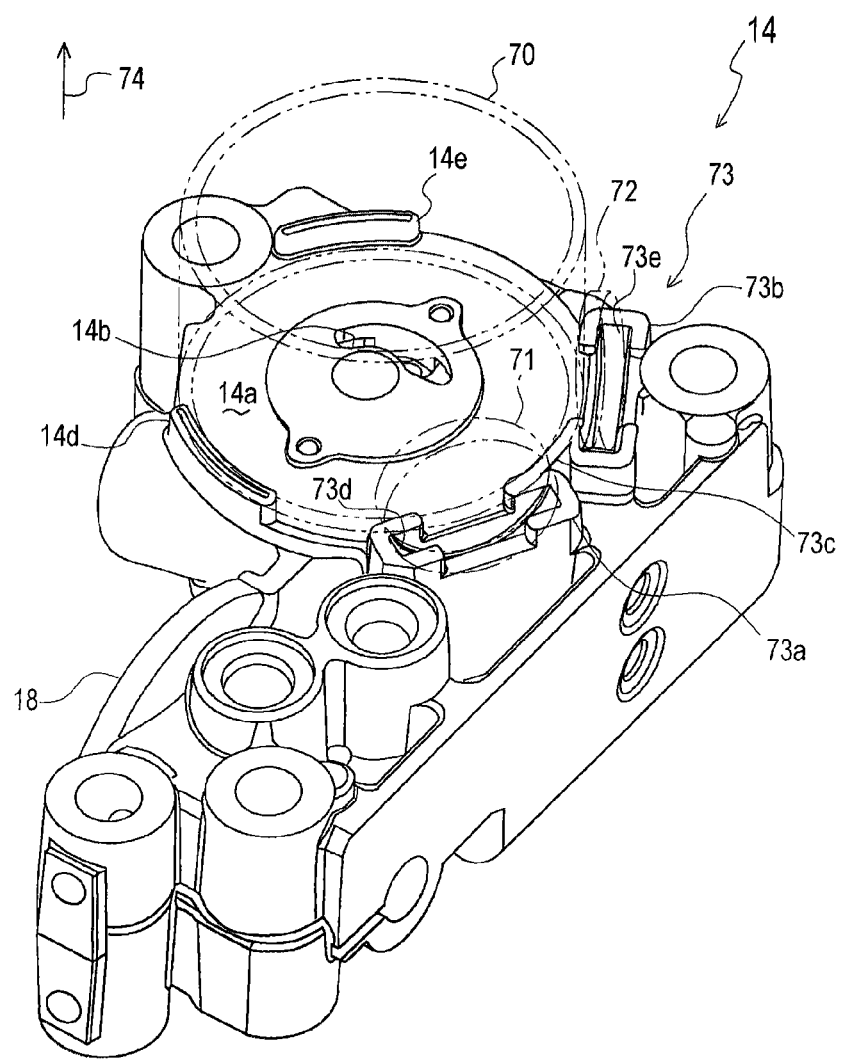
FIG. 5 is a perspective view of a center section.

In this case, on the circular-shaped lower surface 14a of the center section 14 in the HST 9, arc-shaped guide members 14d and 14e and a magnet holding portion 73 for holding the magnets 71 and 72 are protruded from the vicinity of the outer periphery of the lower surface 14a, in the direction of an arrow 74 in FIG. 5, namely toward the inner bottom surface of the lower housing 4R.

The oil filter 70 has a tubular shape such that it covers the periphery of the open portion at the lower end of the oil hole 14b in the lower surface 14a and, also, is placed between the lower surface 14a of the center section 14 and the inner bottom surface of the lower housing 4R in the oil reservoir within the first oil chamber R1. Further, the oil filter 70 is guided and supported such that its upper portion is contacted with the guide members 14d and 14e and the inner surface of the magnet holding portion 73, which prevents the oil filter 70 from being detached outwardly from the lower surface 14a.

The magnet holding portion 73 is constituted by a first holding portion 73a for holding the magnet 71, a second holding portion 73b for holding the magnet 72 and a coupling portion 73c for coupling the second holding portion 73b and the first holding portion 73a to each other, wherein all the portions are formed integrally with the center section 14 through casting or the like. The holding portions 73a and 73b, out of them, are provided with fitting slots 73d and 73e, in parallel to tangential directions of the outer peripheral surface of the oil filter 70. The upper portion of the magnet 71 can be fitted and secured to the fitting slot 73d, out of them, while the upper portion of the magnet 72 can be fitted and secured to the fitting slot 73e, similarly.

This can hold the magnets 71 and 72 without providing an additional mounting member, such as a cover plate. Furthermore, the magnets 71 and 72 can be placed at positions spaced apart by a predetermined interval 75 from the outer peripheral surface of the oil filter 70, such that the magnets' longitudinal directions are along the outer peripheral surface of the oil filter 70, so that the lubrication oil reaches the outer peripheral surface of the oil filter 70 by traveling over the front and back sides of the magnets 71 and 72 and, then, flows into the oil filter 70 as a working fluid by passing through fine holes constituting the oil filter 70.

Accordingly, while the lubrication oil travels around the magnets 71 and 72, iron powder is attracted and adhered to the opposite surfaces of the magnets 71 and 72 and, further, many residences and vortexes are induced in the lubrication oil around the magnets 71 and 72, so that even fine iron powder is drawn into these residences and vortexes and then is directly attracted and adhered to the magnets 71 and 72. Further, the coupling portion 73c is curved, at its inner surface, such that it conforms to the outer peripheral surface of the oil filter 70, which makes it easier to guide and support the oil filter 70 with the magnet holding portion 73.

On the other hand, on the inner bottom surface of the lower housing 4R, protruding stoppers 4Ra and 4Rb protruding upwardly are formed, at the positions opposing to the holding portions 73a and 73b, respectively, so that the magnet 71 can be pushed toward the fitting slot 73d in the first holding portion 73a through the stopper 4Ra among them and, similarly, the magnet 72 can be pushed toward the fitting slot 73e in the second holding portion 73b through the stopper 4Rb.

This can cause forces for fitting the magnets 71 and 72 into the fitting slots 73d and 73e to act on the magnets 71 and 72 continuously, which can sandwich the magnets 71 and 72 between the holding portions 73a and 73b and the stoppers 4Ra and 4Rb, thereby preventing the magnets 71 and 72 from being freely disengaged from the fitting slots 73d and 73e due to pressures caused by the flow of the lubrication oil, vibrations caused by the driving of the HST 9 and the drive train 10 and the like.

That is, with the aforementioned structure, in the axle driving device 1R which includes the HST 9 which is a hydrostatic transmission having the hydraulic pump 12 and the hydraulic motor 13 which are in fluid communication with one another through the closed circuit within the center section 14 of the HST 9, the axle 7R capable of being driven by driving power of various speeds from the HST 9, the common housing 2R housing the HST 9 and the axle 7R, the center section 14 is provided with the oil hole 14b for supplying the working fluid to the closed circuit, the oil hole 14b is connected to the oil filter 70 placed in the oil reservoir within the housing 2R, and the magnets 71 and 72 are provided near the oil filter 70, and the magnet holding portion 73 which holds the magnets 71 and 72 is formed integrally with the center section 14.

Accordingly, with the axle driving device 1R, it is possible to mount the magnets 71 and 72 at a portion of the center section 14 for reducing iron powder in the working fluid to be supplied to the closed circuit. This eliminates the necessity of using an additional mounting member, thereby reducing the number of components. This can reduce the component cost and improve the ease of assembling. Further, in comparison with cases where the magnets 71 and 72 are held, through attraction, at a portion near the oil filter 70 through the magnetic forces thereof, it is possible to secure the magnets 71 and 72 firmly, which can prevent the magnets 71 and 72 from freely moving and impinging on peripheral components such as the oil filter 70 to induce fractures of these components or to cause iron power which has been attracted and held on the magnets 71 and 72 to disperse peripherally due to the impingement. This can elongate the lives of the components and can increase the iron-powder elimination efficiency.

Further, it is preferable to form, on the inner wall of the housing 2R, the stoppers 4Ra and 4Rb as magnet mounting seat portions for fixing the magnets 71 and 72 by sandwiching them between the stoppers 4Ra and 4Rb and the magnet holding portion 73.

This enables fixing the magnets 71 and 72 more firmly by sandwiching the magnets 71 and 72 between the magnet holding portion 73 in the center section 14 and the stoppers 4Ra and 4Rb in the housing 2R. This can prevent the magnets 71 and 72 from moving freely, thereby further elongating the lives of components and increasing the iron-powder elimination efficiency.

Furthermore, preferably, the oil filter 70 has a tubular shape covering an opening of the oil hole 14b, the magnets 71 and 72 have a plate shape, and the magnets 71 and 72 are interposed between the center section 14 and the housing 2R such that the longitudinal directions of the magnets 71 and 72 are along the outer peripheral surface of the oil filter 70.

This can utilize the surfaces of the plate-shaped magnets 71 and 72 at the opposite sides as surfaces for attracting iron powder, which can increase the attraction area, thereby further increasing the iron-powder elimination efficiency. Further, the flow of the working fluid which is flowing into the inside of the oil filter 70 through the outer peripheral surface of the cylindrical oil filter 70 is blocked by the plate-shaped magnets 71 and 72 placed along the oil filter 70, which can induce many flow-residence areas and vortexes around the magnets 71 and 72, thereby causing fine iron powder capable of transmitting through the oil filter 70, as well as coarse iron powder, to be drawn into these residence areas and vortexes and attracted and adhered to the magnets 71 and 72. This enables elimination of iron powder with various grain sizes, through attraction. Further, hereinafter, various types of embodiments of the axle driving devices 1L and 1R will be described, and the same components will be designated by the same reference characters and the same component names as those of the axle driving devices 1L and 1R.

Next, with reference to FIGS. 6 to 8, there will be described axle driving devices 101L and 101R according to a second example as another embodiment of the axle driving devices 1L and 1R. Further, the description will be given by exemplifying the right axle driving device 101R, similarly to in the case of the axle driving devices 1L and 1R.

The axle driving device 101R is realized by adding, to the axle driving device 1R, an axle height adjustment structure capable of changing the height of the axis of the axle 7R from the ground (hereinafter, referred to as an "axle height"), according to the increase and decrease of the wheel diameter along with the change of the vehicle rank. This can eliminate the necessity of using dedicated casings, components and the like which have been required for respective vehicle ranks, since the wheel diameter is increased and decreased to vary the axle center depending on the vehicle rank. This enables standardization of components.

Figure 6:
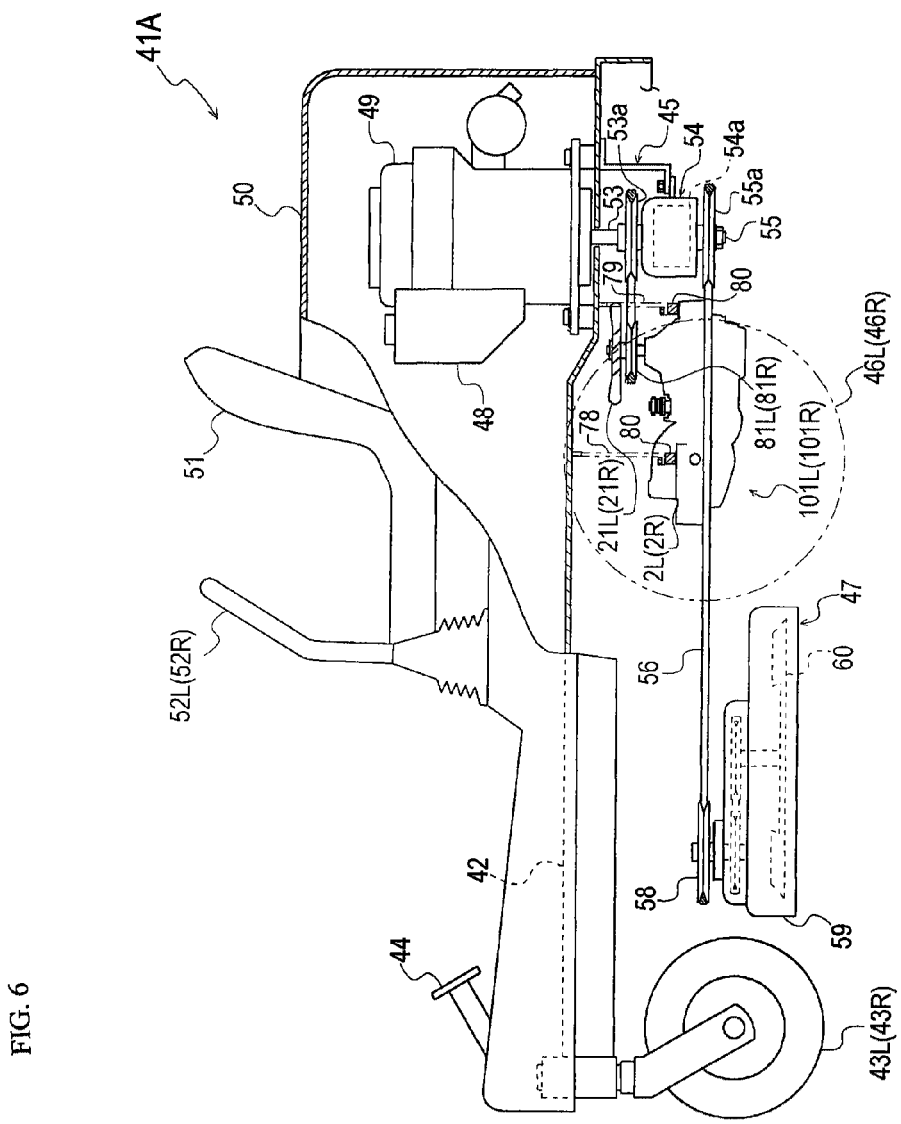
FIG. 6 is a partial cross-sectional side view of a hydraulically-driven work vehicle according to a second example of the present invention.
Figure 7:
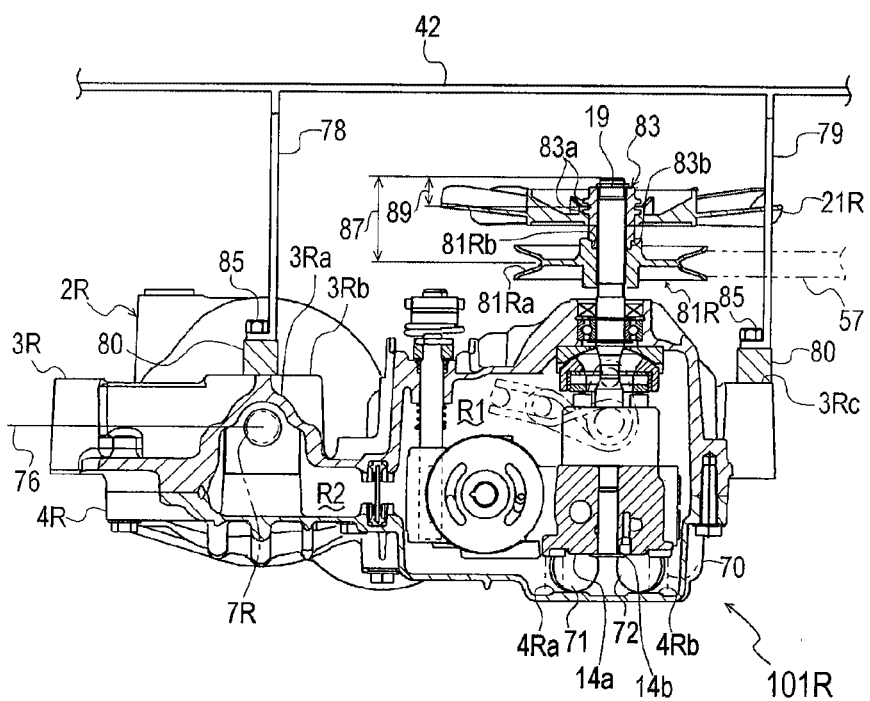
FIG. 7 is a partial cross-sectional side view of an axle driving device, illustrating a case where an axle height is lower at a mounting state where an axle driving device according to a second example of the present invention is mounted to a machine frame.

As illustrated in FIGS. 6 and 7, in the axle height adjustment structure, a front bracket 78 and a rear bracket 79 are vertically hung, in the mentioned order in the front-to-rear direction, from the rear half portion of the machine body frame 42 in the hydraulically-driven work vehicle 41A, at a portion more forward than the clutch housing 54. A flat front mounting surface 3Rb positioned above the bearing portion 3Ra is detachably fastened and secured through bolts 85 to the lower end of the front bracket 78, out of them, with a height adjustment spacer 80 interposed therebetween. Similarly, a flat rear mounting surface 3Rc positioned at the rear end of the upper housing 3R is detachably fastened and secured through bolts 85 to the lower end of the rear bracket 79, out of them, with a height adjustment spacer 80 interposed therebetween.

Further, on the pump shaft 19 in the axle driving device 101R, an input pulley 81R is placed below a cooling fan 21R, unlike the input pulley 20R in the axle driving device 1R. Accordingly, even if the input pulley is offset downwardly on the pump shaft 19, the input pulley is prevented from being interfered with the cooling fan 21R. As will be described later, even if the axle driving device 101R is entirely ascended in order to increase the axle height, it is possible to offset the input pulley downwardly, thereby maintaining a constant pulley height.

Furthermore, a boss member 83 is annularly mounted to the upper end portion of the pump shaft 19. The boss member 83 is provided, at a vertically halfway position thereon, with an upper engagement portion 83a with a double ring shape, and the cooling fan 21R is externally fitted and secured to the upper engagement portion 83a. Further, the boss member 83 is provided with a thin lower engagement portion 83b at its lower end portion, and a ring-shaped fitting slot 81Rb in the input pulley 81R is fitted to the lower engagement portion 83b from therebelow, so that the input pulley 81R is externally fitted and secured to the lower engagement portion 83b. Thus, the cooling fan 21R and the input pulley 81R are integrally fixed to the pump shaft 19, through the boss member 83 and the like.

Figure 8:
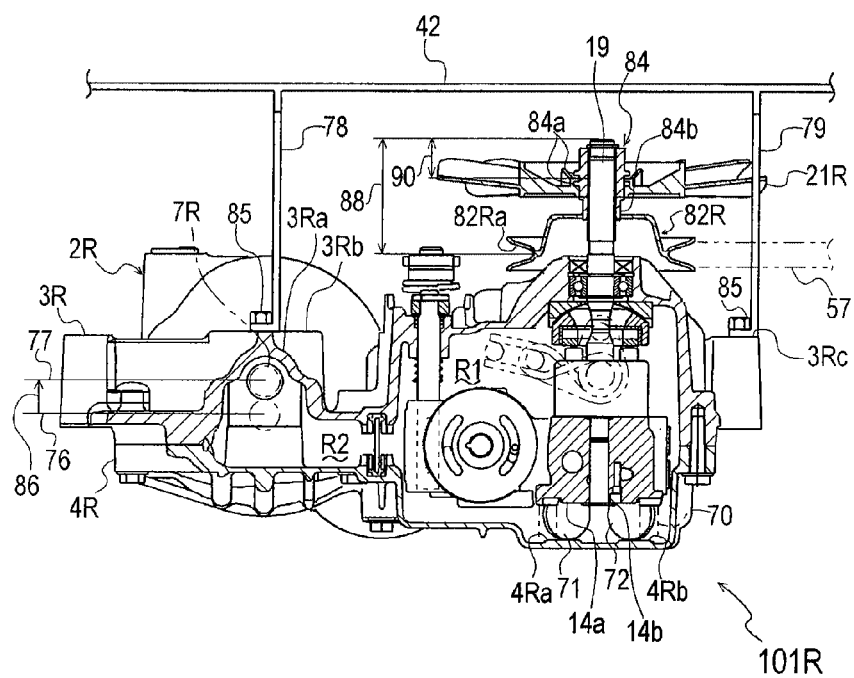
FIG. 8 is a partial cross-sectional side view of the axle driving device, illustrating a case where the axle height is higher.

As illustrated in FIGS. 7 and 8, in order to increase the axle height with the aforementioned structure, at first, the bolts 85 and 85 fastening and securing the upper housing 3R to the lower ends of the front and rear brackets 78 and 79 are detached, and the entire axle driving device 101R is detached from the brackets 78 and 79. In the axle driving device 101R which has been detached, the cooling fan 21R, the boss member 83 and the input pulley 81R are pulled out, in the mentioned order, from the upper end of the pump shaft 19 and, thereafter, an offset type input pulley 82R, a boss member 84 capable of fitting the input pulley 82R to a lower engagement portion 84*b* thereof, and the cooling fan 21R which can be externally fitted and secured to an upper engagement portion 84*a* of the boss member 84 are fitted and secured, in the mentioned order, to the pump shaft 19 through its upper end. Further, the distance 90 from the upper end portion of the boss member 84 to the upper engagement portion 84*a* is set to be larger than the distance 89 from the upper end portion of the boss member 83 to the upper engagement portion 83*a*, which offsets the cooling fan 21R downwardly.

After the boss member 83 is replaced with the boss member 84, and the normal input pulley 81R is replaced with the offset type input pulley 82R without replacing the cooling fan 21R as described above, the front and rear mounting surfaces 3Rb and 3Rc in the upper housing 3R are directly fastened and secured to the lower ends of the front and rear brackets 78 and 79 through the bolts 85 and 85, without interposing the height adjustment spacers 80 therebetween. Accordingly, the axle driving device 101R is ascended to come closer to the machine body frame 42 by an amount provided by eliminating the height adjustment spacers 80 and 80. This also increases the axle height from a height 76 to a height 77, in other words, by an amount 86 which is the difference between both the axle heights (hereinafter, referred to as an "adjustment width").

In this case, the distance 88 from the upper end of the pump shaft 19 to a substantially center position vertically on the pulley slot 82Ra in the input pulley 82R (hereinafter, referred to as a "pulley distance") is larger than the pulley distance 87 provided by the normal input pulley 81R and, thus, the pulley slot 82Ra is offset on the pump shaft 19, wherein this downward offset width is set to be substantially equal to the upward adjustment width 86 for the axle height 76. Accordingly, even if the axle height 76 is increased and the height of the pump shaft 19 is increased, the pulley slot 82Ra in the input pulley 82R on the pump shaft 19 is downwardly offset by an amount corresponding to the height increase. As a result, the heights of the pulley slots 81Ra and 82Ra before and after the adjustment of the axle height are equal to each other.

That is, in the axle height adjustment structure adapted to support, through hanging, the axle driving device 101R on the machine body frame 42 through the length-adjustable supporting member for adjusting the height of the axle 7R in the axle driving device 101R, the offset type input pulley 82R is provided on the pump shaft 19 which is the input shaft for the axle driving device 101R, and the offset width of the input pulley 82R is set to be substantially equal to the adjustment width 86 for the height of the axle 7R in the opposite direction. This can provide a substantially constant pulley slot height in the input pulley, even before and after the axle height adjustment. This enables addressing the change of the vehicle rank along with the axle height adjustment, only by replacing the input pulley 81R as an externally-mounted component with the input pulley 82R, without making changes to the structure for transmitting the driving power from the engine 49 to the input pulley 82R, as well as to the machine body frame 42, the housing 2R of the axle driving device 101R and the structure for transmitting the driving power within the housing 2R. This enables reduction of the component cost and large increase of the efficiency of the physical distribution and management operations due to the standardization of components and also enables improvement of the ease of maintenance due to facilitation of access from the outside.

Further, the length-adjustable supporting member is constituted by the brackets 78 and 79 provided vertically on the machine body frame 42 and the adjustment spacers 80 and 80 interposed between the brackets 78 and 79 and the housing 2R of the axle driving device 101R. This enables adjusting the axle height with the simple structure without using a complicated structure. This enables immediately addressing the vehicle rank change along with the axle height adjustment and, also, enables reduction of the number of components, thereby further reducing the component cost and improving the ease of maintenance.

Further, the distance from the upper end of the pump shaft 19 to the center of the cooling fan 21R in the axial direction (hereinafter, referred to as a "fan distance") is set, such that, if the boss member 83 is replaced with the boss member 84 as described above for changing the position of the upper engagement portion from the position 83*a* to the position 84*a* for downwardly offsetting the cooling fan, the fan distance is increased from the distance 89 to the distance 90. Accordingly, even if the axle height 76 is increased and, thus, the height of the pump shaft 19 is increased, it is possible to suppress the height of the cooling fan 21R to a minimum possible height.

That is, since the cooling fan 21R is provided on the pump shaft 19 which is the input shaft, the cooling fan 21R is structured to be mountable to the boss members 83 and 84 for the input pulley 82R, and the boss members 83 and 84 have the respective upper engagement portions 83*a* and 94*a* as the engagement portions for engaging the cooling fan 21R therewith at different axial positions, it is possible to offset the cooling fan 21R in the direction that it gets away from the main machine including the machine body frame 42, thereby preventing the cooling fan 21R from interfering with the machine body frame 42 and other components in the main machine with the simple structure without using the complicated structure only by replacing the boss member 83 with boss member 84. This can prevent the components in the main machine, as well as the cooling fan 21R, from being damaged, thereby increasing the life of the device. Further, this can realize reduction of the number of components, thereby reducing the component cost and improving the ease of maintenance.

Figure 9:
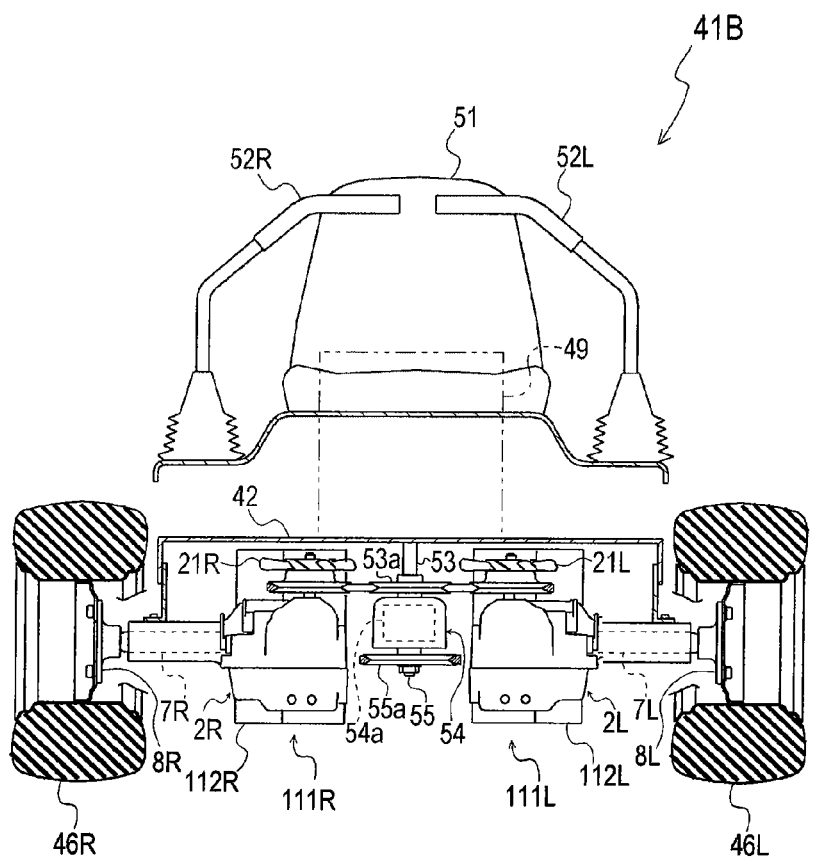
FIG. 9 is a partial cross-sectional front view of a hydraulically-driven work vehicle according to a third example of the present invention.
Figure 10:
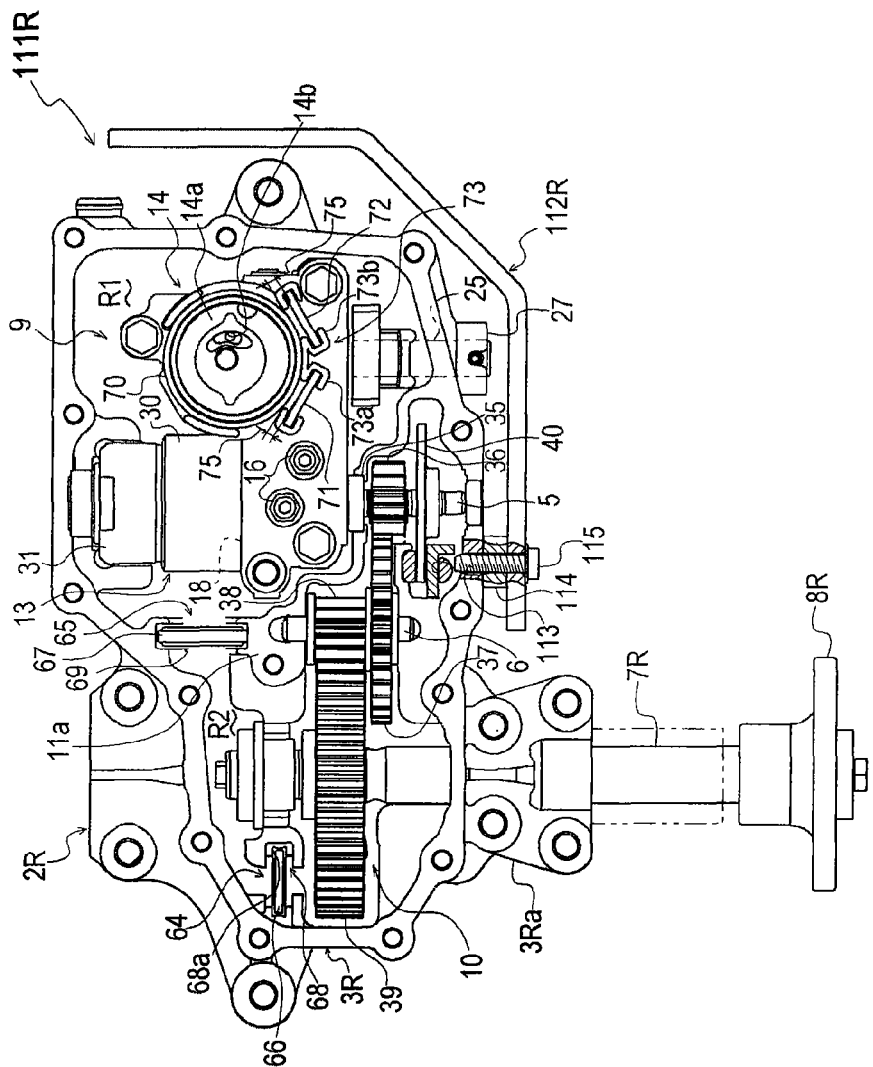
FIG. 10 is a partial cross-sectional bottom view of an axle driving device according to the third example of the present invention.
Figure 11:
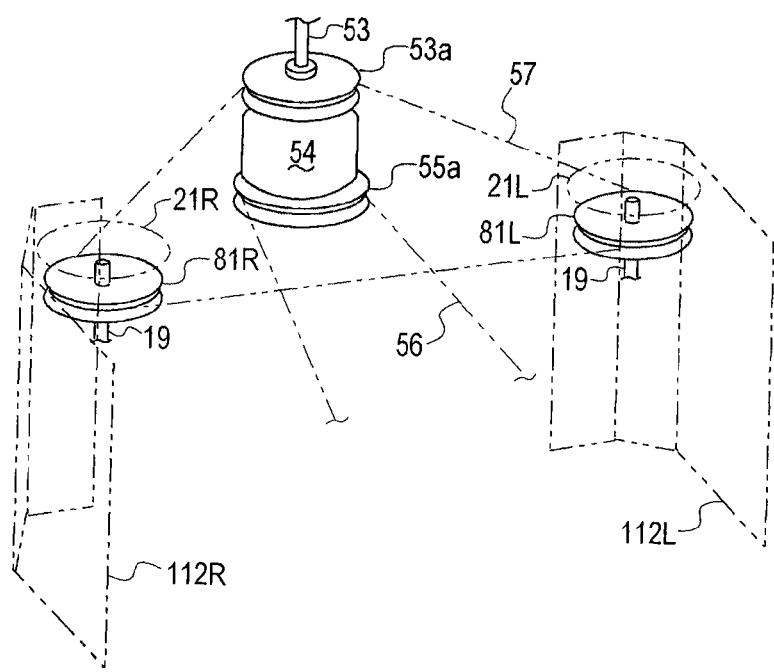
FIG. 11 is a perspective view of a portion for transmission from an engine output shaft to the axle driving device, illustrating a state where an air control plate is placed.

Next, with reference to FIGS. 9 to 11, there will be described axle driving devices 111L and 111R according to a third example as another embodiment of the axle driving devices 1L and 1R.

The axle driving devices 111L and 111R are realized by adding, to the axle driving devices 101L and 101R, an air control structure for efficiently cooling, with air, the lubrication oil which has been heated to a high temperature by heat generated by the hydraulic driving of the HST 9, the gear driving of the drive train 10 and the like, through a cooling fan in the engine 49 (which is not illustrated), the cooling fans 21L and 21R in the axle driving devices 101L and 101R and the like. Further, the description will be given by exemplifying the right axle driving device 111R, similarly to in the case of the axle driving devices 101L and 101R.

In the air control structure, an air control plate 112R with a laterally-reversed L shape when viewed at its bottom surface is extended in the forward and rearward directions, from a side of the brake disk 40 to a position behind the HST 9, along the outer peripheral side surface of the axle driving device 111R in the hydraulically-driven work vehicle 41B, and the air control plate 112R is extended vertically from the lower end of the housing 2R to cover up to the cooling fan 21R at the upper end portion of the pump shaft 19. Further, the air control plate 112R is detachably fastened and secured, at its front portion, to a threaded hole 113 provided in the upper housing 3R through a bolt 115 with an amount-of-spacing adjustment spacer 114 interposed therebetween.

In the axle driving device 111L, similarly, an air control plate 112L with an L shape when viewed at its bottom surface is extended in the forward and rearward directions from a side of the brake disk 40 to a position behind the HST 9 and is extended vertically from the lower end of the housing 2L to cover up to the cooling fan 21L at the upper end portion of the pump shaft 19. Further, the air control plate 112L is detachably fastened and secured, at its front portion, to a thread hole 113 provided in the upper housing 3L through a bolt 115 with an amount-of-spacing adjustment spacer 114 interposed therebetween.

With this structure, cooling air being flowed in the top-to-bottom direction by the cooling fan in the engine 49 (which is not illustrated) and the cooling fans 21L and 21R in the axle driving devices 111L and 111R is blocked by the air control plates 112L and 112R which are mounted in the axle driving devices 111L and 111R with the simple structure, which reduces the proportion of the cooling air which is diffused to the outside. This can direct the cooling air up to the axle driving devices 111L and 111R along the housings 2L and 2R, without waste thereof.

That is, since there are provided the air control plates 112L and 112R for guiding cooling air up to the outer peripheries of the axle driving devices 111L and 111R such that these air control plates 112L and 112R are provided in the axle driving devices 111L and 111R, it is possible to increase the efficiency of cooling the axle driving devices 111L and 111R, without additionally providing a mounting member such as a stay for mounting the air control plates 112L and 112R. This enables reduction of the number of components, thereby reducing the component cost and improving the ease of maintenance. Further, there is no need for performing the operations for mounting the air control plates 112L and 112R in the narrow space between the axle driving devices and the main machine. The air control plates 112L and 112R can be preliminarily mounted to the axle driving devices 111L and 111R in a large place and, thereafter, it is necessary only to support the axle driving devices 111L and 111R on the machine body frame 42. This can largely improve the workability in mounting them.

Figure 12:
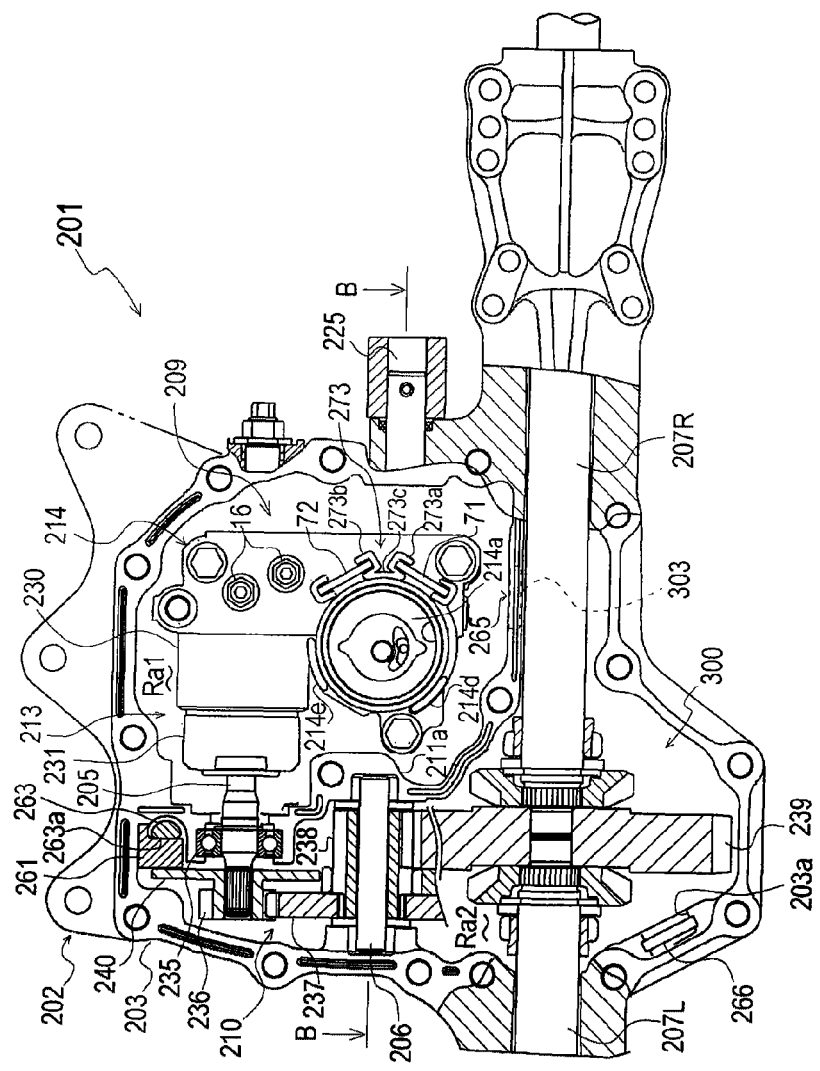
FIG. 12 is a partial cross-sectional bottom view of an axle driving device according to a fourth example of the present invention.
Figure 13:
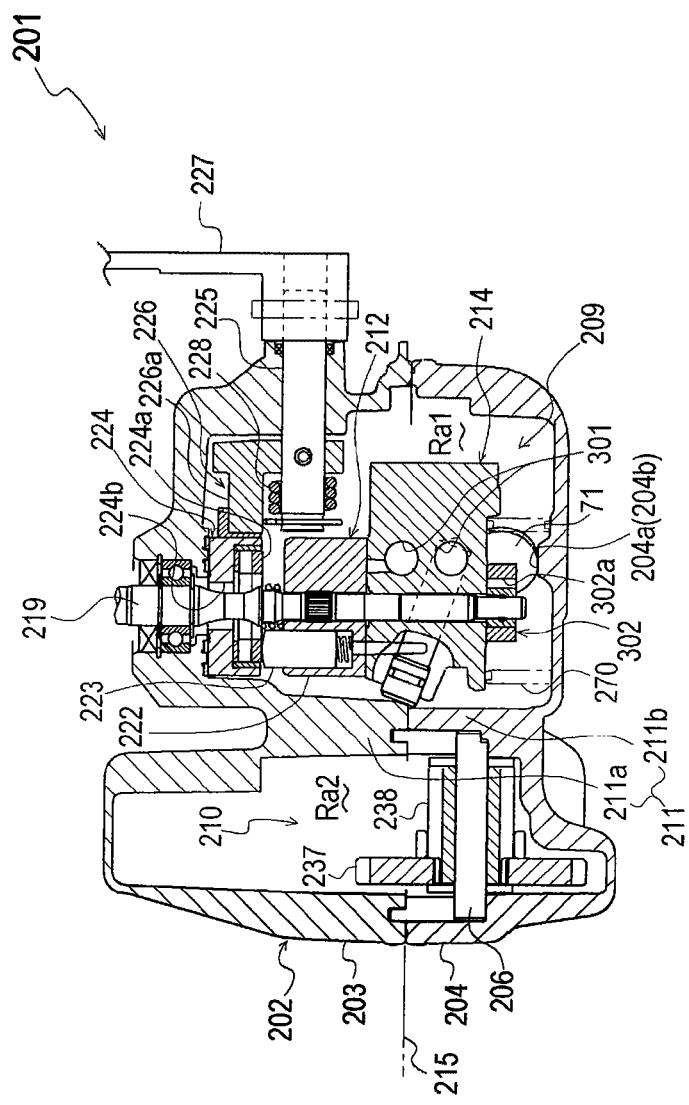
FIG. 13 is a cross-sectional view taken along the line B-B in FIG. 12.

Next, with reference to FIGS. 12 and 13, there will be described an axle driving device 201 according to a fourth example as another embodiment of the axle driving devices 1L and 1R.

The axle driving device 201 is structured to include a common HST 209 and a common drive train 210 which are provided within a single housing 202 and, further, include a differential device 300 interposed between the drive train 210 and the respective axles 207L and 207R, instead of including the HSTs 9 and the drive trains 10 for the respective axles 7L and 7R, as the axle driving devices 1L and 1R. This can reduce the number of components required in the axle driving device, thereby enabling reduction of the component cost and compaction of the machine body.

At first, the entire structure of the axle driving device 201 will be described.

Similarly to in the case of the axle driving devices 1L and 1R, the housing 202 of the axle driving device 201 is constituted by an upper housing 203 and a lower housing 204 which are bonded to each other at a bonding plane 215 at their outer edges, and a bearing portion for a motor shaft 205, which will be described later, is provided within the bonding plane 215. Further, the axles 207L and 207R are placed within the upper housing 203 such that they are biased upwardly from the bonding plane 215 and are rotatably supported. The axles 207L and 207R are differentially coupled to each other through the differential device 300, while the outer ends of the axles 207L and 207R are protruded outwardly through the left and right outer side walls of the housing 202, and flanges for mounting the wheels, not illustrated, are secured to the protruded ends.

The inside of the housing 202 is partitioned into a first oil chamber Ra1 and a second oil chamber Ra2 by an internal wall 211 formed integrally with the housing 202. The first oil chamber Ra1, out of them, houses an integrated HST 209 constituted by a hydraulic pump 212 and a hydraulic motor 213 which are fluidly connected to each other through a center section 214. The second oil chamber Ra2 houses the axles 207L and 207R and the drive train 210. As described above, the common HST 209, the drive train 210, the differential device 300 and the left and right axles 207L and 207R are housed within the single housing 202, so that the axle driving device 201 is relatively compact.

Further, similarly to in the case of the axle driving devices 1L and 1R, the internal wall 211 is constituted by an upper wall portion 211a vertically hung from the ceiling surface of the upper housing 203 toward the bonding plane 215 and a lower wall portion 211b raised toward the bonding plane 215 from the inner bottom surface of the lower housing 204. Since the upper housing 203 and the lower housing 204 are bonded to each other, both the wall portions 211a and 211b are bonded to each other at their end surfaces, thereby defining and forming the two independent oil chambers Ra1 and Ra2 within the housing 202, such that the first oil chamber Ra1 and the second oil chamber Ra2 are adjacent to each other. Further, an oil reservoir is formed in each of the first oil chamber Ra1 and the second oil chamber Ra2 and, these oil reservoirs are filled with common lubrication oil which can be supplied as a working fluid to the HST 209.

Next, the structure of the HST 209 and the variable-speed control structure in the axle driving device 201 will be described.

Similarly to in the case of the axle driving devices 1L and 1R, the center section 214 in the HST 209 is detachably fastened and secured through bolts 16 or the like, from therebelow, to the inside of the upper housing 203 within the first oil chamber Ra1. Further, the center section 214 is placed such that its longitudinal direction coincides with the forward and rearward directions, namely with a direction substantially orthogonal to the axles 207L and 207R, and the hydraulic motor 213 is placed on a vertical surface at its front portion, while the hydraulic pump 212 is placed on a horizontal surface at the rear portion of the center section 214.

In the hydraulic pump 212, a pump shaft 219 is vertically supported at the center thereof, in a plan view, and the pump shaft 219 is outwardly protruded through the upper wall of the upper housing 203, so that the driving power from the engine is inputted thereto. Further, in the hydraulic pump 212, similarly, there are provided a cylinder block 222, a plurality of pistons 223 which are reciprocally fitted within a plurality of cylinder holes in the cylinder block 222 through biasing springs, and a movable inclined plate 224 which is contacted with the head portions of the pistons 223 through a thrust bearing 224a. An opening portion 224b is provided at the center of the movable inclined plate 224 for allowing the pump shaft 219 to penetrate therethrough.

In order to perform operations for inclining the movable inclined plate 224, a control shaft 225 parallel to the axles 207L and 207R is rotatably supported in the right side wall of the upper housing 203 at the opposite side of the HST 209 from the drive train 210, and a variable-speed arm 227 coupled to the steering lever 52 and the like in conjunction therewith through a link mechanism, not illustrated, is mounted to the end portion of the control shaft 225 extending to the outside of the housing. A swaying arm 226 is mounted to the end portion of the control shaft 225 inside the housing, and a protrusion 226a formed on the swaying arm 226 is directly engaged with a slot portion in a side surface of the movable inclined plate 224.

A neutral returning spring 228 of a torsion coil spring type is externally fitted to the control shaft 225, and the neutral returning spring 228 is engaged with the swaying arm 226. If the operation force applied to the variable-speed arm 227 is released, the movable inclined plate 224 is automatically restored to a neutral position through the swaying arm 226, due to the restoring force generated at one end of the neutral returning spring 28.

With this structure, if the variable-speed arm 227 in the axle driving device 201 is rotated in the forward or rearward direction of the machine body by operating the left or right steering lever 52L or 52R and the like, the swaying arm 226 is forwardly or rearwardly rotated about the control shaft 225 to perform operations for inclining the movable inclined plate 224, thereby performing an operation for changing the output of the hydraulic pump 212.

In the hydraulic motor 213, similarly, there are provided a cylinder block 230, a plurality of pistons (which are not illustrated) which are fitted within a plurality of cylinder holes in the cylinder block 230 through biasing springs, and a fixed inclined plate 231 which is contacted with the head portions of the pistons. Further, the fixed inclined plate 231 is sandwiched and fixed between the upper housing 203 and the lower housing 204.

The hydraulic motor 213 and the hydraulic pump 212 are fluidly connected to each other through a closed circuit constituted by oil paths 301 and the like which are formed in the center section 214. Further, a charge pump 302 for supplying a working fluid to this closed circuit is provided at the lower end of the pump shaft 219 protruding downwardly through the center section 214, and an inlet port 302a of the charge pump 302 is opened in the downward direction of the center section 214, while an outlet port of the charge pump 302 (which is not illustrated) is communicated with the closed circuit through a check valve (which is not illustrated), so that the oil within the oil reservoir within the housing 202 can be introduced through the inlet port 302a and can be supplied as a working fluid to the closed circuit.

Next, there will be described the structure for transmitting the driving power from the HST 209 to the axles 207L and 207R.

The motor shaft 205 is protruded toward the drive train 210 through the fixed inclined plate 231 placed in the first oil chamber Ra1, this protruded end is rotatably supported by the internal wall 211 through a bearing 235 constituted by a bearing provided with a seal or the like, and the tip end thereof is inserted in the second oil chamber Ra2.

Further, the drive train 210 for transmitting the driving power from the motor shaft 205 to the differential device 300 is constituted by an output gear 236 secured to the motor shaft 205 protruding into the second oil chamber R2, a large-diameter gear 237 which is kept engaged with the output gear 236 and is supported on a counter shaft 206 parallel to the motor shaft 205, a small-diameter gear 238 with a larger width which is supported on the counter shaft 206 which is rotated integrally with the large-diameter gear 237, and a ring gear 239 in the differential device 300 which is kept engaged with the small-diameter gear 238, thereby constituting a speed reduction gear train capable of inputting the driving power which has been generated from the engine and changed in speed by the HST 209 to the differential device 300 after the speed reduction through the output gear 236, the large-diameter gear 237, the small-diameter gear 238 and the ring gear 239 in the mentioned order. Through the driving power with the changed speed which is inputted to the differential device 300 as described above, it is possible to differentially drive the axles 207L and 207R.

Further, a brake disk 240 is formed integrally with the output gear 236 at its side closer to the HST 209. A brake pad 261 is contacted with the inner surface of the brake disk 240 and, further, a brake operation shaft 263 which is coupled to the brake pedal 44 in conjunction therewith through a brake lever, wiring and the like, not illustrated, is placed on the inner surface of the brake pad 261. The lower end of the brake operation shaft 263 is formed into a half-split shape, and the brake pad 261 is contacted with the flat cutout 263a. Accordingly, if an operation for depressing the brake pedal 44 is performed, this rotates the brake operation shaft 263, which causes the end portion of the cutout 263a to push the brake pad 261, thereby applying a resistance to the brake disk 240 for braking the motor shaft 205.

Next, there will be described the structure for mounting magnets in the aforementioned axle driving device 201.

In the axle driving device 201, similarly, a communication path 265 is formed in the internal wall 211 defining the first oil chamber Ra1 which houses the HST 209 and the second oil chamber Ra2 which houses the drive train 210, so that the lubrication oil in the first oil chamber Ra1 and the lubrication oil in the second oil chamber Ra2 can intercommunicate with each other through the communication path 265. However, a porous oil filter 303, instead of a magnet, is fitted and placed in the communication path 265, unlike in the axle driving device 1. This can reduce the flow-path resistance at the communication path 265, which can facilitate the flow of the lubrication oil between both the oil chambers Ra1 and Ra2, thereby increasing the efficiency of cooling the lubrication oil.

Further, the communication path 265 is formed in the internal wall 211 near the axle 207R, so that the lubrication oil flows from the drive train 210 along a long flow path reaching the communication path 265, through the differential device 300. Further, a concave portion 203a is formed in the inner side surface of the upper housing 203 halfway through the long flow path, and a plate-shaped magnet 266 is fitted and secured within the concave portion 203a.

With this structure, iron powder mixed in the lubrication oil within the housing 202, particularly iron powder which has been cut away from the respective gears in the drive train 210 and the differential device 300 and mixed in the lubrication oil during driving the respective gears at the state where the adjacent gears are kept engaged with each other, is attracted and adhered to the magnet 266 to be eliminated, while it passes by the magnet 266. Further, the iron powder is filtered by the oil filter 303 to be eliminated, while it passes through the communication path 265, so that the lubrication oil is cleaned.

Further, when the lubrication oil which has been cleaned to some degree is supplied as a working fluid to the HST 209, it passes by magnets 71 and 72 placed through the same mounting structure as that in the axle driving devices 1L and 1R, then passes through an oil filter 270 for filtering the lubrication oil from the magnets 71 and 72 and, thereafter, is introduced into the closed circuit within the HST 209 through the inlet port 302a, the pump chamber within the charge pump 302 (which is not illustrated) and the outlet port.

Further, similarly to in the case of the axle driving devices 1L and 1R, the center section 214 in the HST 209 is provided with a circular-shaped lower surface 214a, and arc-shaped guide members 214d and 214e and a magnet holding portion 273 for holding the magnets 71 and 72 through fitting are protruded from the vicinity of the outer periphery of the lower surface 214a toward the inner bottom surface of the lower housing 204.

The oil filter 270 has a tubular shape such that it covers the periphery of the open portion of the inlet port 302a of the charge pump 302 and, also, is placed between the lower surface 214a of the center section 214 and the inner bottom surface of the lower housing 204R, in the oil reservoir within the first oil chamber Ra1. Further, the oil filter 270 is guided and supported such that its upper portion is contacted with the guide members 214d and 214e and the inner side surface of the magnet holding portion 273, which prevents the oil filter 270 from being detached outwardly from the lower surface 214a, similarly to in the case of the axle driving devices 1L and 1R.

The magnet holding portion 273 is constituted by a first holding portion 273a for holding the magnet 71, a second holding portion 273b for holding the magnet 72 and a coupling portion 273c for coupling the second holding portion 273b and the first holding portion 273a to each other, wherein all the portions are formed integrally with the center section 214. The upper portions of the magnets 71 and 72 can be fitted and secured in the fitting slots formed in the holding portions 273a and 273b, respectively. On the other hand, on the inner bottom surface of the lower housing 204, protruding stoppers 204a and 204b protruding upwardly are formed, at the positions opposing to the holding portions 273a and 273b, respectively, and the magnets 71 and 72 can be pushed toward the fitting slots which are not illustrated, through the stoppers 204a and 204b. Thus, similarly to in the case of the axle driving devices 1L and 1R, the magnets 71 and 72 can be sandwiched and held between the holding portions 273a and 273b and the stoppers 204a and 204b.

As described above, in the axle driving device 201, similarly to in the axle driving devices 1L and 1R, it is possible to mount the magnets 71 and 72 at a portion of the center section 214 for eliminating iron powder in the working fluid to be supplied to the closed circuit. This eliminates the necessity of using an additional mounting member, which can reduce the number of components, thereby reducing the component cost and improving the ease of assembling. Further, in comparison with cases where the magnets 71 and 72 are held, through absorption, at a portion near the oil filter 270 through the magnetic forces thereof, it is possible to secure the magnets 71 and 72 firmly, which can prevent the magnets 71 and 72 from freely moving and impinging on peripheral components such as the oil filter 270 to induce fractures of these components or to cause iron power which has been attracted and held on the magnets 71 and 72 until then to disperse peripherally due to the impingement. This can extend the lives of the components and increase the iron powder elimination efficiency.

Figure 14:
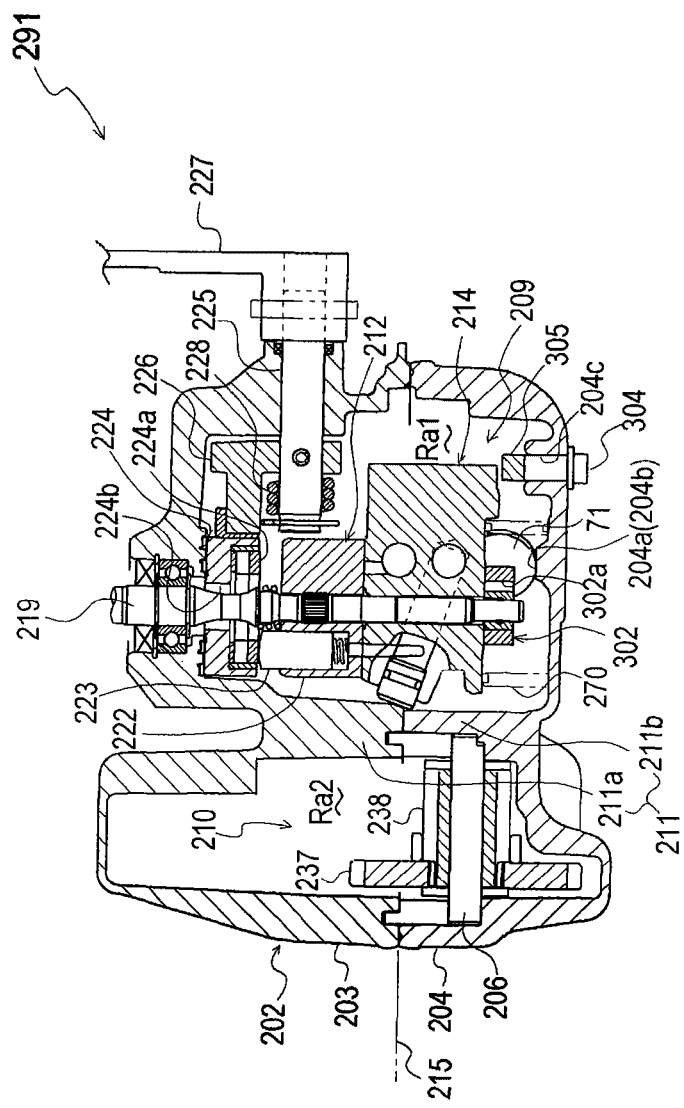
FIG. 14 is a partial cross-sectional front view of an axle driving device according to a fifth example of the present invention.

Next, with reference to FIG. 14, there will be described an axle driving device 291 according to a fifth example as another embodiment of the axle driving device 201.

The axle driving device 291 is provided by adding, to the axle driving device 201, a sensor structure capable of detecting the amount and the properties of iron powder within the lubrication oil, which enables estimation of the state of contamination (hereinafter, referred to as "the degree of cleanliness") due to iron powder and the like within the lubrication oil at the time of periodic checks.

The sensor structure is constituted by a drain hole 204c formed in the lower housing portion 204 near the outer side of the oil filter 270 within the first oil chamber Ra1, a drain bolt 304 which is threadably inserted in the drain hole 204c from therebelow, and a magnet 305 secured to the tip end of the threaded portion of the drain bolt 304, wherein the magnet 305 is placed halfway through the flow of the lubrication oil which is flowing into the inside of the oil filter 270.

With this structure, iron powder in the lubrication oil just before flowing into the oil filter 270, as a working fluid, is attracted and adhered to the magnet 305 and is gradually deposited thereon, when it passes by the magnet 305 at the tip end of the drain bolt 304 while flowing together with the lubrication oil. Further, at the time of periodic checks, the magnet 305 is disengaged together with the drain bolt 304 and, thereafter, the properties and the amount of the iron powder attracted and adhered to the magnet 305 are observed using analytical equipment or visually to estimate the degree of cleanliness of the lubrication oil.

That is, in the axle driving device 291 which includes the HST 209 which is a hydrostatic transmission having the hydraulic pump 212 and the hydraulic motor 213 which are in fluid communication with one another through the closed circuit within the center section 214 of the HST 209 and also is housed within the housing 202 and includes, within the housing 202, the oil reservoir which is filled with lubrication oil to be supplied as a working fluid to the closed circuit, the sensor structure for estimating the degree of the cleanliness of the lubrication oil includes the drain hole 204c formed in the housing 202 and the drain bolt 304 provided with the magnet 305 which is threadably inserted in the drain hole 204c. This enables periodic estimation of the degree of cleanliness of the lubrication oil, with a simple structure without using a specific member and detection device. This enables proper timing of replacement of the lubrication oil and effectively eliminating iron powder which would adversely affect the durability of the HST 209, thereby enabling further extension of the lives of components and increasing the iron-powder elimination efficiency and also enabling reduction of the costs of components and devices. Further, this enables identification of the causes of failures, from the properties of deposited iron powder.

Further, the drain bolt 304 with the magnet 305 can be threadably inserted in the lower housing 204 within the second chamber Ra2 which houses the drive train 210, instead of in the first oil chamber Ra1. In this case, it is possible to accurately estimate the state of wear of the gear 236 and the like which constitute the drive train 210, by observing the amount and the properties of iron powder.

Next, with reference to FIG. 1 and FIGS. 15 to 17, there will be described the hydraulic circuits in the axle driving devices 1L and 1R, 101L and 101R, 111L and 111R, 201 and 291. Further, these hydraulic circuits are common among all the axle driving devices 1L and 1R, 101L and 101R, 111L and 111R, 201 and 291 and, therefore, the following description will be given with respect to only the axle driving device 1R.

The hydraulic circuits 306 to 308 are provided with a circuit changeover mechanism capable of supplying a working fluid to the charge circuit before returned oil is supplied from the outside to the charge circuit 315, in the case where the returned oil from an external hydraulic apparatus 314 such as a working machine or a power steering is utilized as the working fluid to be supplied to the charge circuit 315. This decreases the time for driving the HST 9 at a state where there is no working fluid, at the start of an initial operation of the assembling line for the hydraulically-driven work vehicle 41.

Figure 15:
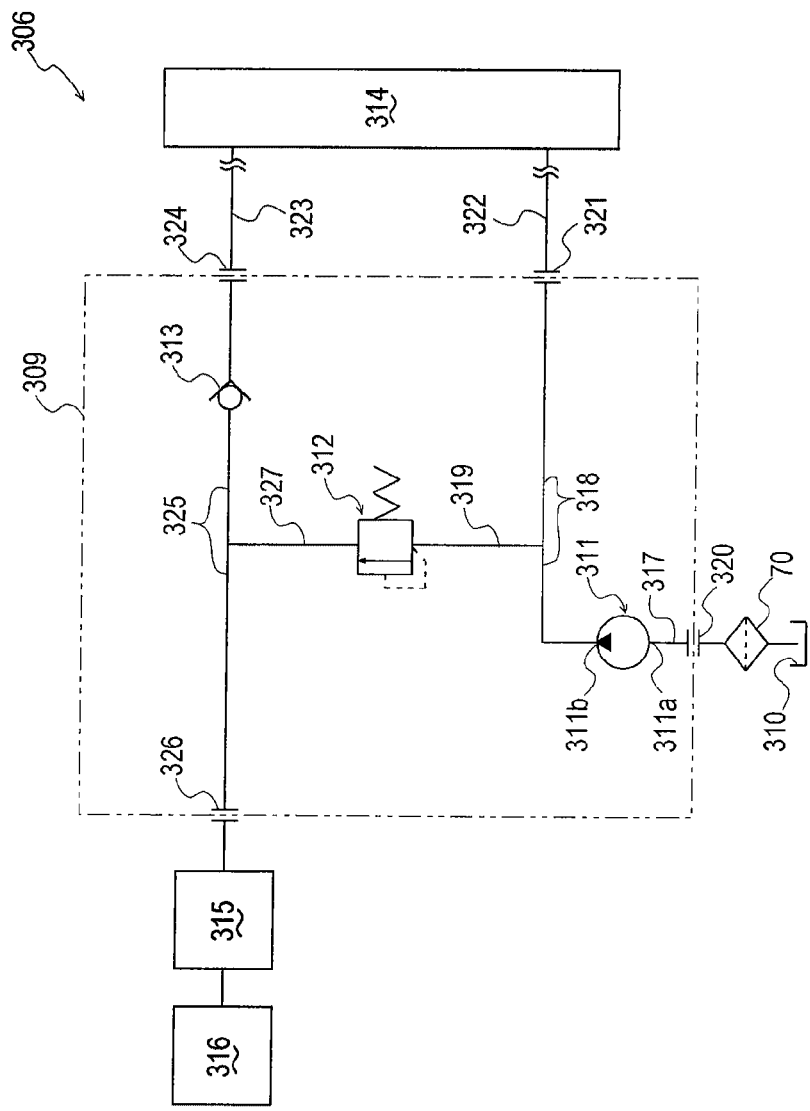
FIG. 15 is a hydraulic circuit diagram illustrating a circuit changeover mechanism for supplying leak oil from a position halfway through an oil path leading to an external hydraulic apparatus to a charge circuit in an HST, during an initial operation.

At first, the hydraulic circuit 306 illustrated in FIG. 15 will be described.

An oil reservoir 310 is formed in the first oil chamber R1, and the oil filter 70 is placed in the oil reservoir 310. The oil filter 70 is connected to the inlet port 311a of the charge pump 311 housed within a charge pump case 309, through a port 320 and an oil path 317, and the lubrication oil within the first oil chamber R1 can be supplied as a working fluid to the charge pump 311.

The outlet port 311b of the charge pump 311 is communicated with an oil path 318, and the oil path 318 is communicated with the external hydraulic apparatus 314 through a port 321 and an external pipe 322. Further, the oil path 318 is communicated with the primary side of a relief valve 312 housed within the charge pump case 309 through a branch oil path 319 which is provided halfway therethrough, so that the working fluid ejected from the charge pump 311 can be adjusted in pressure to a predetermined pressure through the relief valve 312 and, thereafter, can be supplied to the external hydraulic apparatus 314.

The external hydraulic apparatus 314 is communicated with the closed circuit 316 provided inside the center section 14, through an external pipe 323, a port 324, an oil path 325 provided with a check valve 313 at a halfway position thereon, a port 326 and a charge circuit 315 constituted by a check valve and the like which are not illustrated, so that the closed circuit 316 can be supplied with a working fluid from the external hydraulic apparatus 314. Further, the secondary side of the relief valve 312 is communicated to the oil path 325, through an oil path 327, at a position closer to the charge circuit 315 than to the check valve 313.

With the aforementioned structure, in assembling the hydraulically-driven work vehicle 41, if an initial operation is started, the charge pump 311 is driven by the engine 49, which causes the working fluid ejected from the charge pump 311 to be supplied to the external hydraulic apparatus 314 through the oil path 318 and the like and also causes the leak oil leaked through the relief valve 312 at a high pressure to be supplied to the oil path 325 through the oil path 327. That is, during the initial operation, before the return oil from the external hydraulic apparatus 314 is supplied to the charge circuit 315 through the external pipe 323 and the like, the leak oil is supplied to the charge circuit 315 through the relief valve 312 provided between the oil path 318 and the oil path 325.

That is, at the start of an driving of the charge pump 311, there is provided the relief valve 312 as the circuit changeover mechanism for communicating the oil path 318 and the like which are supply oil paths from the charge pump 311 to the external hydraulic apparatus 314 and the oil path 325 and the like which are return oil paths from the external hydraulic apparatus 314 to the charge circuit 315 with each other. This enables immediately supplying the working fluid to the charge circuit 315 for flowing the working fluid into the HST 9 through the closed circuit 316 at the start of the initial operation of the assembling line for the hydraulically-driven work vehicle 41, which can shorten the time for driving the HST 9 at a state where there is no working fluid. This can alleviate initial wear of the internal components such as the cylinder blocks constituting the HST 9, valve plates and the like, thereby extending the life of the HST 9 and reducing the loss horsepower at the start of the initial operation.

Further, the circuit changeover mechanism includes the relief valve 312 for adjusting the pressure of the working fluid to be supplied to the external hydraulic mechanism 314 from the charge pump 311, and the relief valve 312 is communicated at its secondary side with the oil path 325 and the like which are the return oil paths communicated with the charge circuit 315. This eliminates the necessity of additionally providing components for changing over the circuit and enables utilization of the existing components. This can reduce the number of components, thereby reducing the component cost and simplifying maintenance.

In addition, the circuit changeover mechanism is provided within the charge pump case 309 of the charge pump 311, which requires only a small space for installing the circuit changeover mechanism, thereby enabling further compaction of the HST 9.

Figure 16:
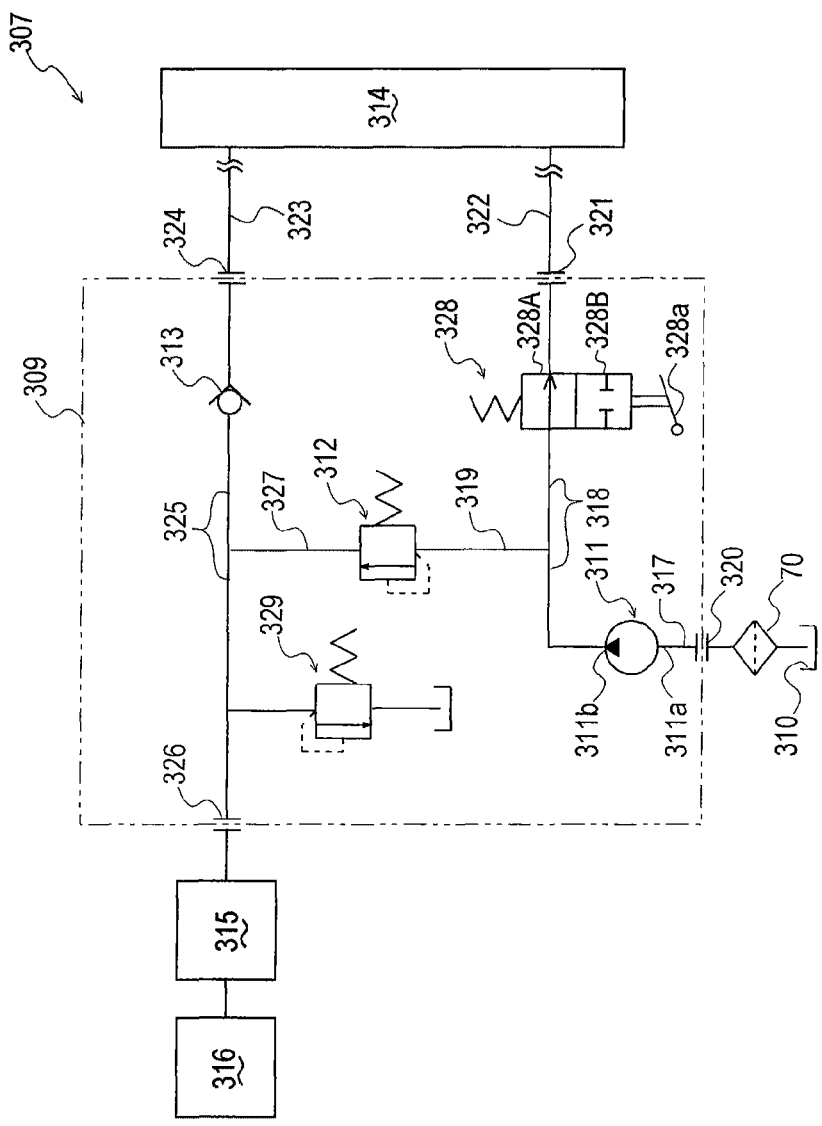
FIG. 16 is a hydraulic circuit diagram illustrating a circuit changeover mechanism for forcibly supplying leak oil from a position halfway through the oil path to a charge circuit in an HST, by changing over and shutting off the oil path leading to an external hydraulic apparatus, during an initial operation.

Subsequently, a hydraulic circuit 307 illustrated in FIG. 16 will be described.

The hydraulic circuit 307 is realized by adding, to the hydraulic circuit 306, a changeover valve 328 for controlling the supply and the shut-off of the working fluid to the external hydraulic apparatus 314 on the oil path 318 at a position after the branching into the oil path 319 but before the port 321 and, further, by adding, thereto, a relief valve 329 for adjusting in pressure the working fluid to be supplied to the charge circuit 315 to a predetermined pressure, on the oil path 325, at a position after the merge of the oil path 327 but before the port 326. Further, the changeover valve 328 can be selectively changed over between an external supply position 328A and an external shut-off position 328B, through a changeover operation with a circuit changeover lever 328a.

With the aforementioned structure, by setting the changeover valve 328 at the external shut-off position 328B with the circuit changeover lever 328a at the start of an initial operation of the assembling line for the hydraulically-driven work vehicle 41, it is possible to shut the oil path 318 off from the external pipe 322 to increase the hydraulic pressure of the working fluid, which can increase the amount of oil leaked to the charge circuit 315 through the relief valve 312. On the contrary, by setting the changeover valve 328 at the external supply position 328A during normal operations after assembling, it is possible to cause the relief valve 312 to function as a normal pressure-adjustment valve.

That is, the circuit changeover mechanism is provided with the relief valve 312 for adjusting the pressure of the working fluid in the oil path 318 which is the supply path from the charge pump 311 to the external hydraulic apparatus 314, wherein the relief valve 312 is communicated at its secondary side with the oil path 325 and the like which are the return oil paths leading to the charge circuit 315 and, further, there is provided the changeover valve 328 for controlling the supply and the shut-off of the working fluid to the external hydraulic apparatus 314 on the oil path 318 which is the supply path from the primary side of the relief valve 312 to the external hydraulic apparatus 314. Accordingly, by setting the changeover valve 328 at the external shut-off position 328B at the start of an initial operation of the assembling line for the hydraulically-driven work vehicle 41, it is possible to stop the supply of the working fluid from the charge pump 311 to the external hydraulic apparatus 314 to raise the hydraulic pressure at the primary side of the relief valve 312, thereby increasing the amount of leak oil supplied to the charge circuit 315 through the relief valve 312. This can cause the leak oil to actively flow into the HST 9 from the closed circuit 316, which can further alleviate the initial wear of the internal components such as the cylinder blocks constituting the HST 9, the valve plates and the like and also can further reduce the loss horsepower at the start of the initial operation.

Figure 17:
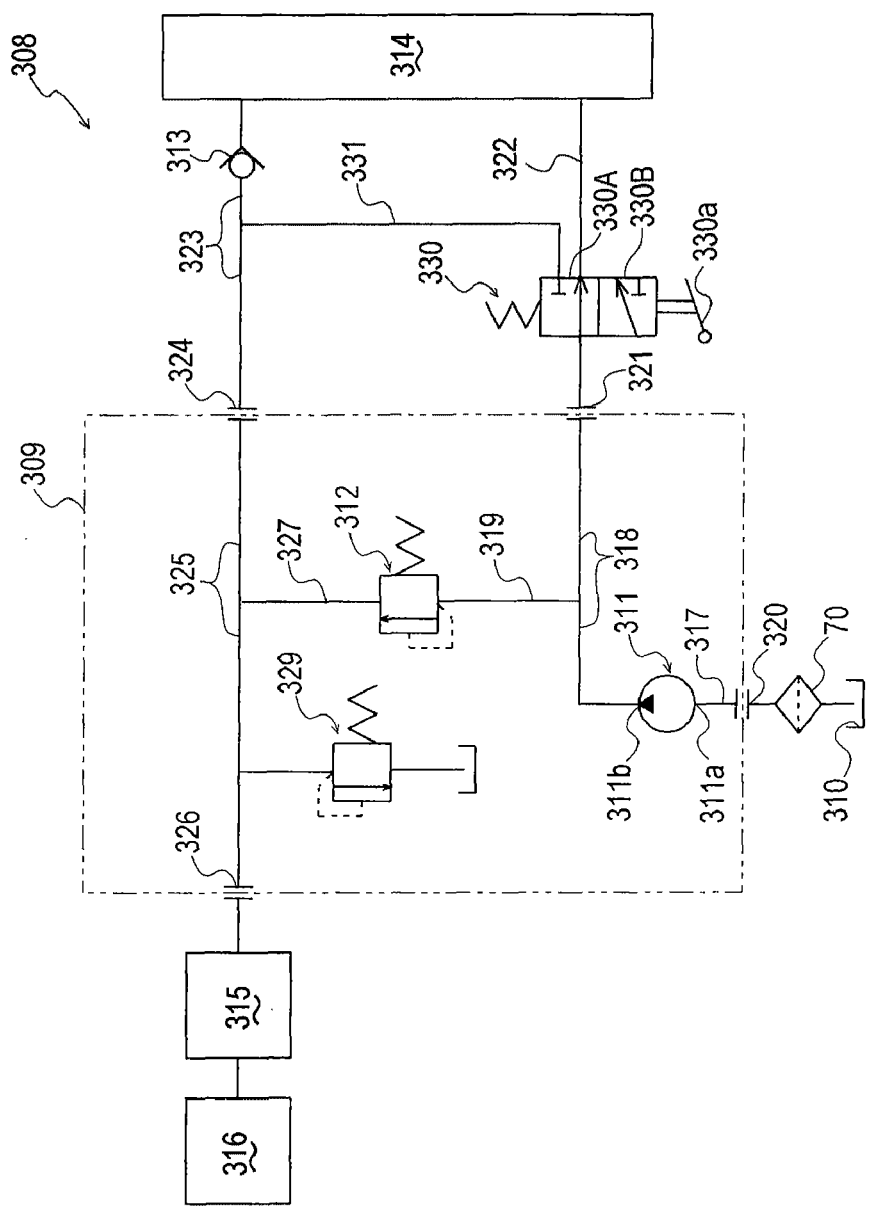
FIG. 17 is a hydraulic circuit diagram illustrating a circuit changeover mechanism for forcibly supplying a working fluid to a charge circuit, by changing over an oil path leading to an external hydraulic apparatus and bypassing it to an oil path leading to the charge circuit in the HST, during an initial operation.

Subsequently, a hydraulic circuit 308 illustrated in FIG. 17 will be described.

The hydraulic circuit 308 is realized by adding, to the hydraulic circuit 307, a changeover valve 330 on the external pipe 322, instead of the changeover valve 328, and further by adding, thereto, a bypass oil path 331 which communicates the changeover valve 330 and the external pipe 323 with each other, and adding the check valve 313 on the external pipe 323 at a position after the external hydraulic apparatus 314 but before the merge of the bypass oil path 331. Further, the changeover valve 330 can be selectively changed over between an external supply position 330A and a bypass position 330B, through a changeover operation with a circuit changeover lever 330a.

With the aforementioned structure, by setting the changeover valve 330 at the bypass position 330B with the circuit changeover lever 330a at the start of an initial operation of the assembling line for the hydraulically-driven work vehicle 41, it is possible to shut the oil path 318 off from the external pipe 322 and, also, it is possible to communicate the oil path 318 with the oil path 325, through the port 321, the external pipe 322, the changeover valve 330, the bypass oil path 331, the external pipe 323 and the port 324. On the contrary, by setting the changeover valve 330 at the external supply position 330A during normal operations after assembling, it is possible to shut off the bypass oil path 331 and, also, it is possible to communicate the oil path 318 with the external hydraulic apparatus 314, thereby causing the return oil from the external hydraulic apparatus 314 to be supplied as a work fluid to the charge circuit 315.

That is, the aforementioned circuit changeover mechanism includes the changeover valve 330 capable of communicating the external pipe 322 directly to the oil path 325 and the like which are the return oil paths leading to the charge circuit 315, without interposing the external hydraulic apparatus 314 therebetween, on the external pipe 322 which is the oil path from the charge pump 311 to the external hydraulic apparatus 314. Accordingly, by setting the changeover valve 330 at the bypass position 330B at the start of an initial operation of the assembling line for the hydraulically-driven work vehicle 41, it is possible to supply a large amount of working fluid from the charge pump 311 to the charge circuit 316 through the bypass oil path 331. This can cause a large amount of the working fluid to flow into the HST 9 through the closed circuit 315, which can further alleviate initial wear of the internal components such as the cylinder blocks constituting the HST 9, the valve plates and the like and also can further reduce the loss horsepower at the start of the initial operation.

There have been described recommended examples of the disclosed device, and those skilled in the art will understand that various types of changes can be made to the present invention, without departing from the spirits and scope defined by the claims which will be described later.

What is claimed is:

1. An axle driving device comprising:
   a hydrostatic transmission having a center section, a hydraulic pump and a hydraulic motor wherein the hydraulic pump and the hydraulic motor are in fluid communication with one another through a closed circuit within the center section, and wherein the center section is provided with an oil hole for supplying fluid to the closed circuit, and is formed integrally with a magnet holding portion;
   an axle capable of being driven by driving power of various speeds from the hydrostatic transmission;
   a housing which houses the hydrostatic transmission and the axle, wherein an inner space of the housing defines an oil reservoir to which an open end of the oil hole of the center section is opened;
   an oil filter placed in the oil reservoir; and
   a magnet held by the magnet holding portion of the center section so as to adjoin the oil filter.

2. The axle driving device according to claim 1, wherein:
   an inner wall of the housing includes a magnet mounting seat, portion, and
   the magnet is fitted to the magnet mounting seat portion so as to be sandwiched between the magnet mounting seat portion and the magnet holding portion.

3. The axle driving device according to claim 1, wherein the oil filter has a tubular shape so as to have an open end surrounding the open end of the oil hole of the center section and so as to have an outer peripheral surface extended from the open end of the oil filter wherein:
   the outer peripheral surface of the oil filter has fine holes through which fluid is introduced from the oil reservoir outside of the oil filter into the oil reservoir inside of the oil filter so as to be introduced into the oil hole of the center section,
   the magnet has a plate shape having a flat surface, and
   the magnet's longitudinal direction is along the outer peripheral surface of the oil filter such that the flat surface of the magnet faces the outer peripheral surface of the oil filter.

4. The axle driving device according to claim 2, wherein the oil filter has a tubular shape so as to have an open end surrounding the open end of the oil hole of the center section and so as to have an outer peripheral surface extended from the open end of the oil filter, wherein:
   the outer peripheral surface of the oil filter has fine holes through which fluid is introduced from the oil reservoir outside of the oil filter into the oil reservoir inside of the oil filter so as to be introduced into the oil hole of the center section,
   the magnet has a plate shape having a flat surface, and
   the magnet is interposed between the center section and the housing such that the magnet's longitudinal direction is along the outer peripheral surface of the oil filter and such that the flat surface of the magnet faces the outer peripheral surface of the oil filter.

5. The axle driving device according to claim 1, wherein the magnet holding portion and the magnet serve as a first magnet holding portion and a first magnet, respectively, and wherein the center section is formed integrally with a second magnet holding portion, the axle driving device further comprising:
   a second magnet held by the second magnet holding portion so as to adjoin the oil filter.

6. The axle driving device according to claim 5, wherein:
   the oil filter has a tubular shape so as to have an open end surrounding the open end of the oil hole of the center section and so as to have an outer peripheral surface extended from the open end of the oil filter,
   the outer peripheral surface of the oil filter has fine holes through which fluid is introduced from the oil reservoir outside of the oil filter into the oil reservoir inside of the oil filter so as to be introduced into the oil hole of the center section,
   each of the first and second magnets has a plate shape having a flat surface, and
   the first and second magnets' longitudinal directions are along the outer peripheral surface of the oil filter such that the flat surfaces of the respective first and second magnets face the outer peripheral surface of the oil filter.

7. The axle driving device according to claim 6, wherein the first and second magnet holding portions of the center section are formed so as to have an angle between the longitudinal directions of the respective first and second magnets held by the respective first and second magnet holding portions, thereby making the flat surfaces of the respective first and second magnets face the outer peripheral surface of the oil filter.

8. The axle driving device according to claim 5, wherein:
an inner wall of the housing includes first and second magnet mounting seat portions,
the first magnet is fitted to the first magnet mounting seat portion so as to be sandwiched between the first magnet mounting seat portion and the first magnet holding portion, and
the second magnet is fitted to the second magnet mounting seat portion so as to be sandwiched between the second magnet mounting seat portion and the second magnet holding portion.

9. The axle driving device according to claim 8, wherein:
the oil filter has a tubular shape so as to have an open end surrounding the open end of the oil hole of the center section and so as to have an outer peripheral surface extended from the open end of the oil filter,
the outer peripheral surface of the oil filter has fine holes through which fluid is introduced from the oil reservoir outside of the oil filter into the oil reservoir inside of the oil filter so as to be introduced into the oil hole of the center section,
each of the first and second magnets has a plate shape having a flat surface, and
the first and second magnets are interposed between the center section and the housing such that the first and second magnets' longitudinal directions are along the outer peripheral surface of the oil filter and such that the flat surfaces of the respective first and second magnets face the outer peripheral surface of the oil filter.

10. The axle driving device according to claim 9, wherein the first and second magnet holding portions of the center section and the first and second magnet mounting seat portions of the housing are formed so as to have an angle between the longitudinal directions of the respective first and second magnets sandwiched between the respective first and second magnet holding portions and the respective first and second magnet mounting seat portions, thereby making the flat surfaces of the respective first and second magnets face the outer peripheral surface of the oil filter.

11. The axle driving device according to claim 1, wherein the magnet holding portion has a slot into which the magnet is fitted.

12. The axle driving device according to claim 5, wherein:
the first magnet holding portion has a slot into which the first magnet is fitted, and
the second magnet holding portion has a slot into which the second magnet is fitted.

* * * * *